United States Patent [19]

Matsumura et al.

[11] Patent Number: 6,002,428
[45] Date of Patent: *Dec. 14, 1999

[54] MOTION VECTOR DETECTION CIRCUIT AND OBJECT TRACKING CAMERA DEVICE UTILIZING THE SAME

[75] Inventors: Hideki Matsumura, Kyoto; Akio Kobayashi; Hiroshi Nakashima, both of Osaka, all of Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/546,219

[22] Filed: Oct. 20, 1995

[30] Foreign Application Priority Data

Oct. 21, 1994 [JP] Japan .................................. 6-256477
Oct. 31, 1994 [JP] Japan .................................. 6-267347
Nov. 2, 1994 [JP] Japan .................................. 6-269388

[51] Int. Cl.$^6$ .............................. H04N 5/32; H04N 7/18
[52] U.S. Cl. .......................... 348/169; 348/170; 348/416; 348/699
[58] Field of Search .................... 348/169, 170, 348/171, 172, 699, 700, 416, 415, 411, 410; 354/430

[56] References Cited

U.S. PATENT DOCUMENTS

| | | | |
|---|---|---|---|
| 5,371,536 | 12/1994 | Yamaguchi | 348/169 |
| 5,416,513 | 5/1995 | Morisaki | 348/169 |
| 5,512,974 | 4/1996 | Abe et al. | 348/169 |
| 5,546,125 | 8/1996 | Tomitaka et al. | 348/169 |
| 5,574,498 | 11/1996 | Sakamoto et al. | 348/171 |

*Primary Examiner*—Anand S. Rao
*Attorney, Agent, or Firm*—Armstrong, Westerman, Hattori, McLeland & Naughton

[57] ABSTRACT

A motion vector detection circuit includes a registration determining switch which sets a first registration determination mode wherein at an initial field, correlation values are evaluated by a correlator on the basis of integrated color data of a specific detection block being stored in a representative color memory and integrated color data of twenty-five (25) detection blocks being stored in an integrated color memory. A comparison circuit compares the correlation values with a predetermined threshold value, and if a condition that the threshold value is larger than the correlation value is satisfied in each of eighty (80) percents or more detection blocks, the integrated color data stored in the representative color memory is registered as a representative color of an object, and otherwise, no registration is performed. In a second registration determination mode set by the registration determining switch, the correlator evaluates correlation values on the basis of the integrated color data of the specific detection block and integrated color data of four (4) detection block.

22 Claims, 25 Drawing Sheets

PIXEL (yij, (r-y)ij, (b-y) ij)

☐ DETECTION BLOCKS

TOTAL NUMBER OF DETECTION BLOCKS

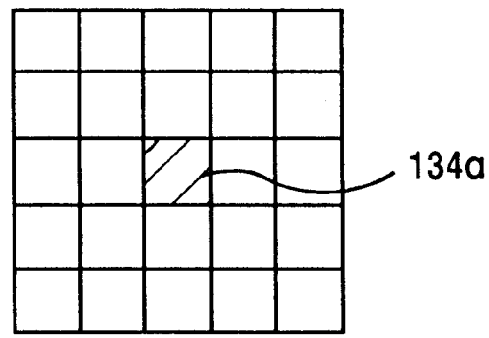
FIG.12(A)
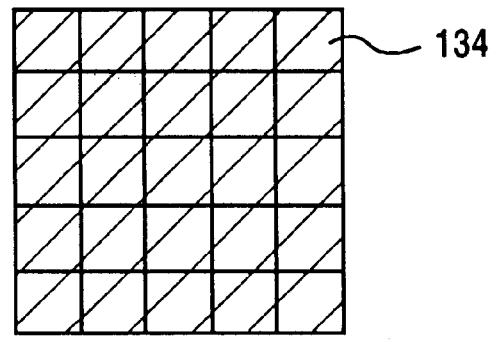
FIG.12(B)
FIG.13
PIXEL (yij, (r-y)ij, (b-y) ij)
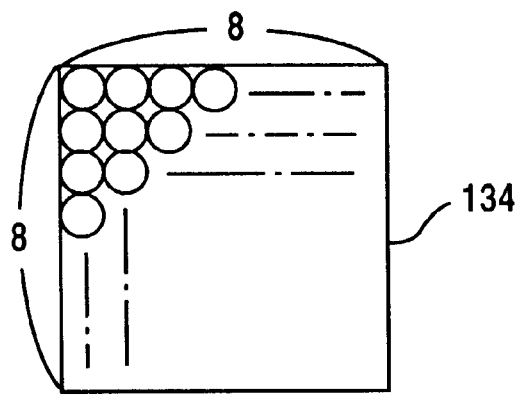

☐ DETECTION BLOCKS
☐ SPECIFIC DETECTION BLOCKS
▨ SAME COLOR DETECTION BLOCKS

START LABELING

TERMINATE LABELING

□ LABEL #1   ⌐ ¬ LABEL #0   CONST = 5

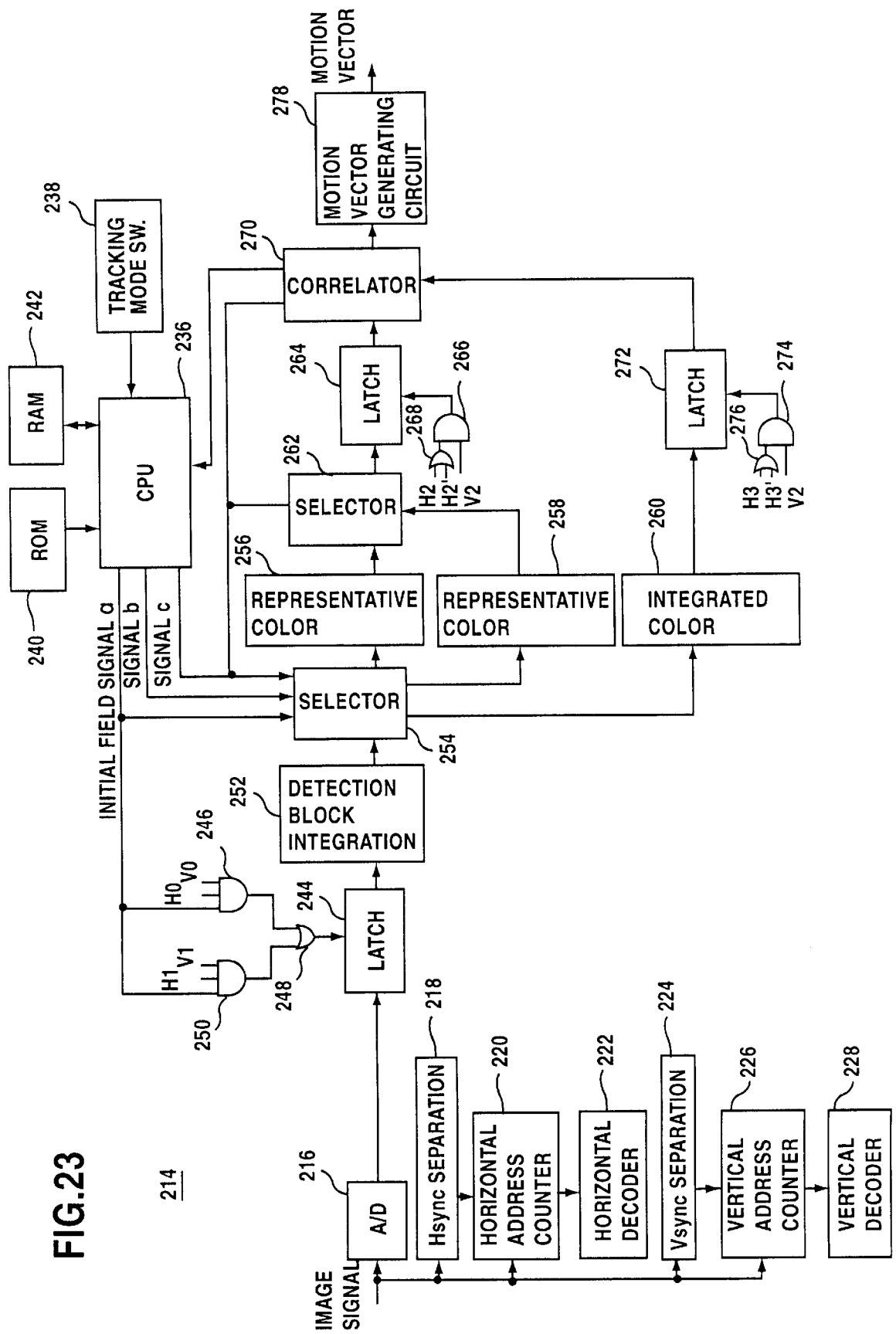

TOTAL NUMBER OF DETECTION BLOCKS

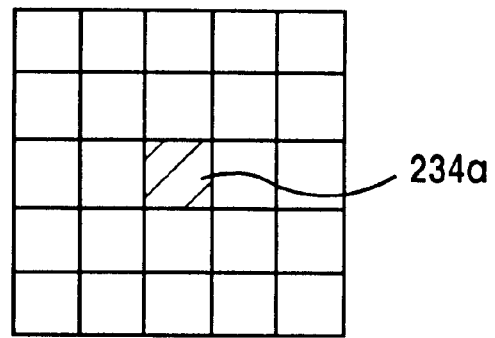
FIG.25(A)
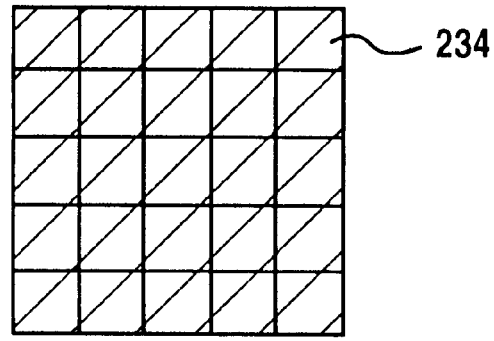
FIG.25(B)
FIG.26
PIXEL (yij, (r-y)ij, (b-y) ij)
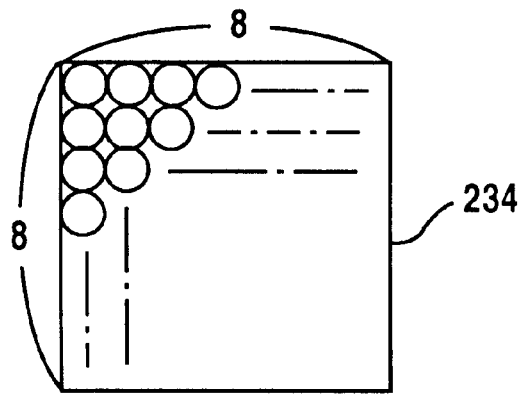

□ DETECTION BLOCKS

□ DETECTION BLOCKS

□ DETECTION BLOCKS

MOTION VECTOR DETECTION CIRCUIT AND OBJECT TRACKING CAMERA DEVICE UTILIZING THE SAME

BACKGROUND OF THE INVENTION

1. Field of the Invention

The present invention relates to a motion vector detection circuit and an object tracking camera device utilizing the motion vector detection circuit. More specifically, the present invention relates to a motion vector detection circuit which may be utilized in a video camera automatically tracking an object, for example, and an object tracking camera device utilizing the motion vector detection circuit.

2. Description of the Prior Art

As an object tracking technique in taking an object which moves within a screen by a camera, there was a technique which utilizes color information. In such a technique, the color information is detected from an image signal within a designated detection block, and the color information is utilized to determine a target object by registering the color information as a specific color. However, in the prior art, in a case where a color existing in a small area of the object accidentally enters the designated detection block and the color occupies the most of an area of the detection block, the specific color to be registered is largely affected by an influence of the color existing in the small area rather than a color being representative of the object. Therefore, it was difficult to track the object on the basis of the specific color.

Furthermore, another object tracking technique is disclosed in, for example, Japanese Patent Application Laying-Open No. 4(1995)-354490. In this prior art, a specific color is designated as a target, and by detecting the specific color from the image signal, the object is tracked. However, in the prior art, it is required to satisfy an assumption that two or more bodies having the same color as the target color do not exist within the screen, and therefore, in a scene where a plurality of bodies having the same color exist, there was an occasion that the object can not be tracked effectively.

Furthermore, other object tracking technique is disclosed in, for example, Japanese Patent Application Laying-Open No. 61(1986)-9084. In this prior art, color information included in an image signal of the designated detection block is stored, and the object is tracked by renewing the stored color in accordance with an environment of the object. However, in the prior art, since the stored color is renewed at every timing that the environment of the object is changed, the stored color becomes a color different from the color of the object if the stored color is changed many times, and therefore, there was an occasion that it becomes difficult to track the object being targeted.

SUMMARY OF THE INVENTION

Therefore, a principal object of the present invention is to provide a novel motion vector detection circuit.

Another object of the present invention is to provide an object tracking camera device utilizing such a novel motion vector detection circuit.

Another object of the present invention is to provide an object tracking camera device capable of effectively tracking an object.

A motion vector detection circuit according to a first invention, which detects a motion vector of an object with utilizing color information of a plurality of detection blocks defined within a motion vector detection area, and comprises: a first calculation means which obtains first color information data on the basis of color information of a specific detection block; a second calculation means which obtains second color information data for each of desired detection blocks on the basis of color information of each of the desired detection block; and a detection means which detects the motion vector of the object on the basis of the first color information data and the second color information data.

First, the first color information data of the specific detection block out of the plurality of detection blocks defied within the motion vector detection area is calculated by the first calculation means, and the second color information data for each of the desired detection blocks are calculated by the second calculation means. The color information constituting the first color information data and the second color information data include three (3) different kinds of color components such as Y, R-Y and B-Y signals or Y, Cr and Cb signals. Then, the detection means detects the motion vector of the object on the basis of the first color information data and the second color information data.

In an aspect of the present invention, the detection means includes a registration determining means which determines on the basis of the first color information data and the second color information data whether or not the first color information data is to be registered for detecting the motion vector. The detection means detects the motion vector of the object in accordance with a determination result.

In a preferred embodiment, the registration determining means includes a correlation means which detects a correlation value of the first color information data and the second color information data. The correlation value is compared with a predetermined threshold value by a comparing means, and the registration determining means determines on the basis of a comparison result whether or not the first color information data is to be registered.

In a more preferred embodiment, the registration determination means includes a first registration determination means and a second registration determination means which are selected by a selection means in accordance with a state of the object and etc. When the first registration determination means is utilized, the second calculation means calculates the second color information data for each of all the detection blocks, and when the second registration determination means is utilized, the second calculation means calculates the second color information data of each of specific detection blocks the number of which is smaller than the number of all the detection blocks. The specific detection blocks include a left upper detection block, a right upper detection block, a left lower detection block and a right lower detection block, for example.

Then, the first registration determination means determines that the first color information data is to be registered when a rate of the detection blocks in each of which a condition that the threshold value is larger than the correlation value with respect to all the detection blocks is eighty (80) percents or more. The second registration determination means determines that the first color information data is to be registered when the condition that the threshold value is larger than the correlation value is satisfied in all of the specific detection blocks.

Thus, by register determining means, it is determined whether or not the first color information data is registered, that is, whether or not the first color information data can be utilized as the representative color of the object. Therefore, as the first color information data for tracking the object, only the first color information data having higher reliability is utilized.

At a time that the first color information data is registered is a waiting state for an operation of the object tracking, and thereafter, the motion vector detection means detects the motion vector on the basis of the first color information data thus registered. On the other hand, when the first color information data is not registered, a waiting state for an operation of registration determination is set again.

Thus, it is determined whether or not the first color information data is to be registered for tracking the object, and only the first color information data which is determined to be registered and has higher reliability is utilized as the representative color for tracking the object. Therefore, in a case where a color which is not the representative color of the object and exists at a small area of the object accidentally enters within the specific detection block, the first color information data at that time is not registered. Therefore, it is possible to detect the motion vector more correctly, and therefore, it becomes easy to make the camera tracking the object, and accordingly, it is possible to track the object accurately.

In another aspect of the invention) the detection means includes a same color block detecting means which detects one or more detection blocks a color of each of which can be regarded as the same as a color of the specific detection block (hereinafter, may be called as "same color detection block") on the basis of the first color information data and the second color information data. For example, the same color block detection means evaluates a correlation value of the first color information data and the second color information data, and when the correlation value is smaller than a predetermined threshold value, the detection block is the same color detection block. Next, the same color detection blocks are coupled to each other by a large block forming means to form a large block. In a case where a plurality of large blocks exist within the detection area, a large block having a maximum area is selected by a selection means. Therefore, even if a plurality of bodies having the same color as that of the object exists within the screen, the object can be selected. Then, a gravity of the large block having the largest area is detected by a gravity detection means, and the motion vector of the object is detected on the basis of the gravity.

Thus, even if a plurality of bodies having the same color as the color of the object exist within the screen, it is possible to select the object, and therefore, only the object can be effectively tracked.

Furthermore, a plurality of detection blocks may be arranged in a duplicate fashion. In such a case, since the number of second color information data of the detection blocks to be compared with the first color information data of the specific detection block is increased, the tracking of the object can be performed with higher accuracy.

A motion vector detection circuit according to a second invention comprises: a plurality of detection blocks defined within a motion vector detection area; a first calculation means which obtains first color information data on the basis of color information data of a specific detection block at a field just after a start of an operation of an object tracking; a second calculation means which obtains second color information data on the basis of the color information data of the specific detection block at an arbitrary field; a judge means which judges any one of the first color information data and the second color information data is to be utilized for detecting the motion vector; and a detection means which detects the motion vector on the basis of one of the first color information data and the second color information data being judged by the judge means.

By the first calculation means and the second calculation means, the first color information data and the second color information data are obtainable. Then, the judge means determines which one of the first color information data and the second color information data is to be utilized for detecting the motion vector, and according to a judge or determination result, the detection means detects the motion vector.

In a preferred embodiment, the judge means includes a correlation means which first evaluates a correlation value on the basis of the first color information data and a third color information data obtained by a third calculation means, and then, a comparing means compares the correlation value with a predetermined threshold value. If a condition that the correlation value is larger than the threshold value is satisfied in each of all the detection blocks, a possibility determining means determines that the motion vector can not be detected even if the first color information data is utilized.

In response to such a determination, the data which is utilized for detecting the motion vector is changed from the first color information data to the second color information data obtained at a field at the time. Then, in a manner similar to the above described manner, it is determined whether or not the motion vector can be detected with utilizing the second color information data. If the possibility determining means determines that it is impossible to detect the motion vector on the basis of the second color information data, the second color information data is renewed.

During a time that the motion vector is detected with utilizing the second color information data, if the possibility determining means determines that it is possible to detect the motion vector with utilizing the first color information data, the detection means detects the motion vector with utilizing the first color information data again.

In accordance with the present invention, it is possible to detect the motion vector with utilizing suitable color information data, irrespective of a change of the environment, the object can be effectively detected and tracked.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 12(A) is an illustrative view showing a specific detection block, and FIG. 12(B) is an illustrative view showing all detection blocks;

FIG. 13 is an illustrative view showing the detection blocks and pixels;

FIG. 23 is a block diagram showing one example of the motion vector detection circuit of another embodiment according to the present invention;

FIG. 25(A) is an illustrative view showing a specific detection block, and FIG. 12(B) is an illustrative view showing all detection blocks;

FIG. 26 is an illustrative view showing the detection blocks and pixels;

DETAILED DESCRIPTION OF THE PREFERRED EMBODIMENTS

Figure 1:
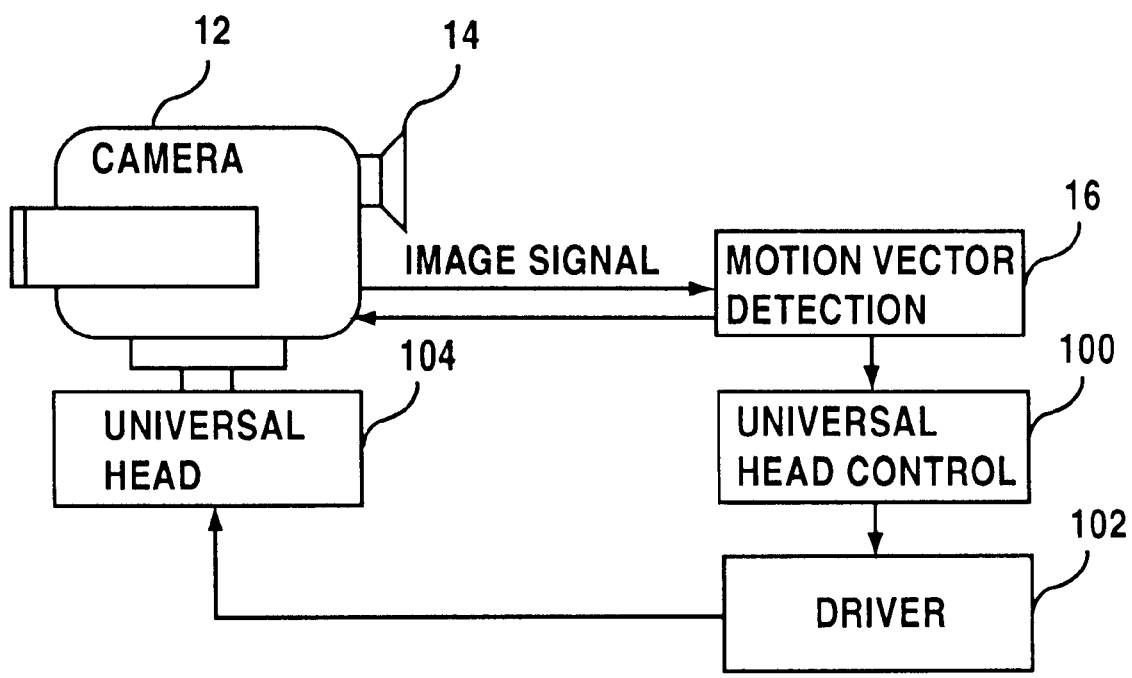
FIG. 1 is a block diagram showing one example of an object tracking camera device of one embodiment according to the present invention.

With referring to FIG. 1, an object tracking camera device 10 of this embodiment shown includes a camera 12 which takes an object and outputs an image signal. On a view finder 14 of the camera 12, an image of the object and characters "NG" representing that integrated color data of color information being stored in a representative color memory 80 is not registered are displayed. The image signal from the camera 12 is applied to a motion vector detection circuit 16 which is constructed as shown in FIG. 2.

Figure 2:
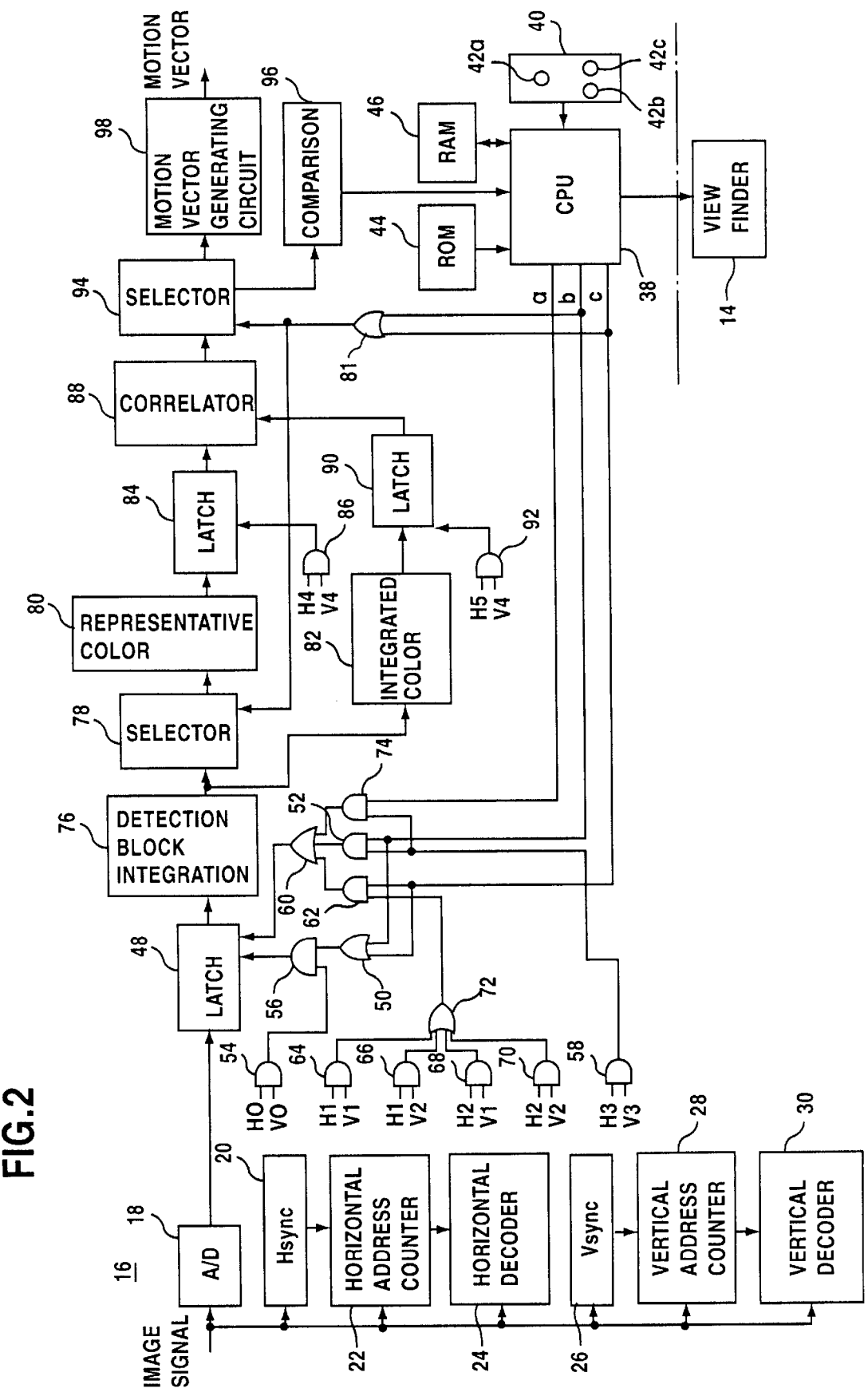
FIG. 2 is a block diagram showing one example of a motion vector detection circuit.

The motion vector detection circuit 16 shown in FIG. 2 includes an A/D converter 18 which converts the image signal into digital data for each pixel. The digital data is data obtained by converting Y, R-Y and B/Y signals.

The image signal is also applied to an Hsync separation circuit 20 and a horizontal address counter 22. The number of pixels in a horizontal direction is counted in the horizontal address counter 22 according to the image signal, and the horizontal address counter 22 is reset at every one line on the basis of a horizontal synchronization signal from the Hsync separation circuit 20. An output from the horizontal address counter 22 is applied to a horizontal decoder 24 which outputs six (6) kinds of horizontal signals H0 to H5.

The image signal is also applied to a Vsync separation circuit 26 and a vertical address counter 28. In the vertical address counter 28, the number of pixels in a vertical direction is counted in accordance with the image signal, and the vertical address counter 28 is reset at every one field on the basis of a vertical synchronization signal from the Vsync separation circuit 26. An output from the vertical address counter 28 is applied to a vertical decoder 30 which outputs five (5) kinds of vertical signals V0 to V4.

Figure 3A:
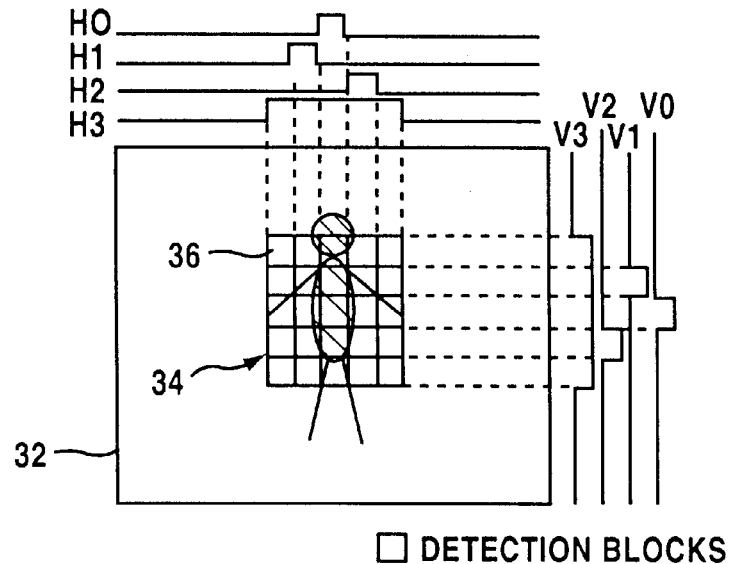
FIG. 3(A) is an illustrative view showing a horizontal signal and a vertical signal for producing an enable signal for a latch circuit 48.
Figure 3B:
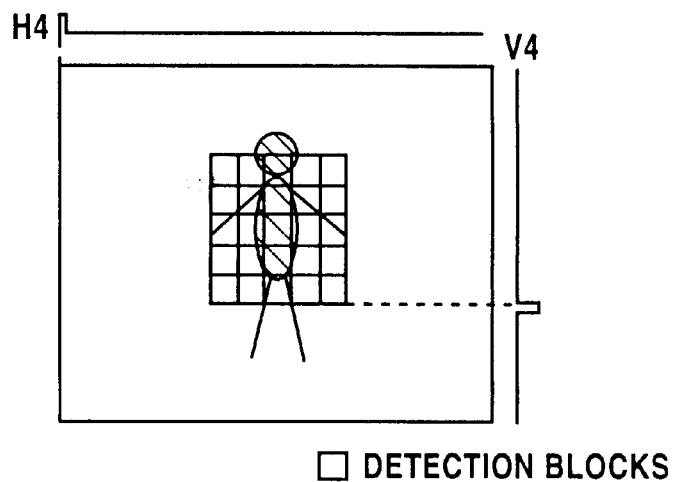
FIG. 3(B) is an illustrative view showing a horizontal signal and a vertical signal for producing an enable signal for a latch circuit 84.
Figure 3C:
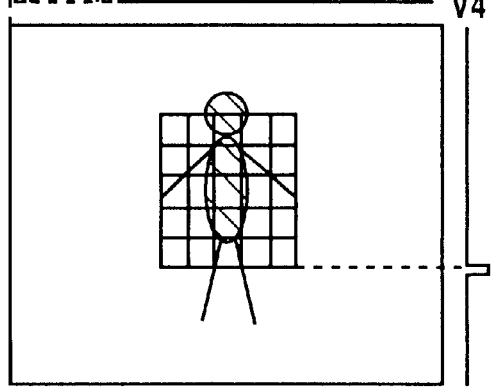
FIG. 3(C) is an illustrative view showing a horizontal signal and a vertical signal for producing an enable signal for a latch circuit 90.

The horizontal signals H0 to H5 and the vertical signals V0 to V4 are shown in FIG. 3(A) to FIG. 3(C). In FIG. 3, a motion vector detection area 34 displayed on a screen 32 of the view finder 14 is divided into a plurality of, twenty-five (25) in this embodiment shown, detection blocks 36.

The motion vector detection circuit 16 includes a CPU 38 to which a switch 40 is connected. The switch 40 includes a tracking mode switch 42a for setting an object tracking mode, registration determining switches 42b and 42c for determining whether or not the integrated color data of the color information being stored in the representative color memory 80 is to be registered, that is, whether or not the integrated color data can be regarded as effective data for detecting a motion vector.

Also with referring to FIG. 4, if the registration determining switch 42b is turned-on, it is determined with utilizing all the detection blocks 36 whether or not the integrated color data of the color information is to be registered. Hereinafter, this mode is called as "first registration determination mode". On the other hand, if the registration determining switch 42c is turned-on, it is determined with utilizing detection blocks 36b, 36c, 36d and 36e being left upper, right upper, left lower and right lower with respect to a specific detection block 36a whether or not the integrated color data of the color information is to be registered. Hereinafter, this mode is called as "second registration determination mode".

These registration determination modes are executed at an initial field, i.e. a field just after the registration determining switch 42b or 42c is turned-on. In addition, when the registration determining switch 42b is turned-on, a signal b is outputted from the CPU 38 at the initial field, and if the registration determining switch 42c is turned-on, a signal c is outputted from the CPU 38 at the initial field. When the tracking mode switch 42a is turned-on, the object tracking mode is set, and a signal a is outputted from the CPU 38 whenever an operation of the object tracking is performed.

Furthermore, a ROM 44 and a RAM 46 are connected to the CPU 38. In the ROM 44, a program for controlling an operation of the motion vector detection circuit 16 is stored in advance, and in the RAM 46, a determination flag indicating whether or not the integrated color data of the color information being stored in the representative color memory 80 is to be registered, etc. are stored.

Then, the digital data of the image signal is latched by a latch circuit 48 on the basis of the horizontal signals H0 to H3, the vertical signals V0 to V3, and the signals a, b and C from the CPU 38.

More specifically, when the registration determining switch 42b is turned-on, the signal b is outputted from the CPU 38 to an OR gate 50 and an AND gate 52 during a period of the initial field. At the initial field, when the horizontal signal H0 and the vertical signal V0 are outputted, an enable signal is applied to the latch circuit 48 via AND gates 54 and 56. Furthermore, at the initial field, when the horizontal signal H3 and the vertical signal V3 are outputted, the enable signal is applied to the latch circuit 48 via AND gates 58 and 52 and an OR gate 60.

Figure 4A:
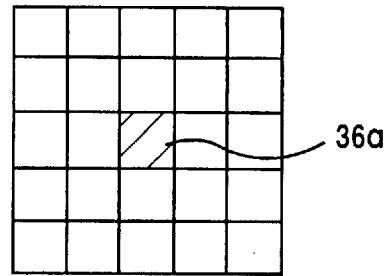
FIG. 4(A) is an illustrative view showing a specific detection block.
Figure 4B:
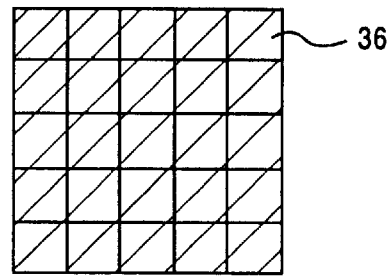
FIG. 4(B) is an illustrative view showing all of detection blocks utilized in a first registration determination mode.

In response to the enable signal from the AND gate 56, the data of respective pixels of the specific detection block 36a shown in FIG. 4(A) are latched in the latch circuit 48. On the basis of the enable signal applied through the AND gate 52 and the OR gate 60, the data of respective pixels of twenty-five (25) detection blocks shown in FIG. 4(B) are latched by the latch circuit 48.

If the registration determining switch 42c is turned-on, the signal c is outputted from the CPU 38 to an AND gate 62 during a period of the initial field. At this time, when the horizontal signal H0 and the vertical signal V0 are outputted, the enable signal is applied to the latch circuit 48 via the AND gates 54 and 56. When the horizontal signal H1 and the vertical signal V1, the horizontal signal H1 and the vertical signal V2, the horizontal signal H2 and the vertical signal V1 or the horizontal signal H2 and the vertical signal V2 are outputted, the enable signal is applied to the latch circuit 48 through AND gates 64 to 70, the AND gate 62 or the OR gate 60.

On the basis of the enable signal from the AND gate 56, the data of the respective pixels of the specific detection block 36a shown in FIG. 4(A) are latched by the latch circuit 48. In response to the enable signal applied through the AND gate 52 and the OR gate 60, the latch circuit 48 latches the data of the respective pixels of the detection blocks 36b to 36e shown in FIG. 4(C). With comparing FIG. 4(A) with FIG. 4(C), it is understood that the detection blocks 36b, 36c, 36d and 36e are detection blocks at left upper, right upper, left lower and right lower with respect to the specific detection block 36a.

Furthermore, if the tracking mode switch 42a is turned-on, the signal a is outputted from the CPU 38 to an AND gate 74. At this time, if the horizontal signal H3 and the vertical signal V3 are outputted, the enable signal is applied to the latch circuit 48 through the AND gate 74 and the OR gate 60. In response to the enable signal, the latch circuit 48 latches the data of the respective pixels all the detection blocks 36 shown in FIG. 4(B).

Figure 4C:
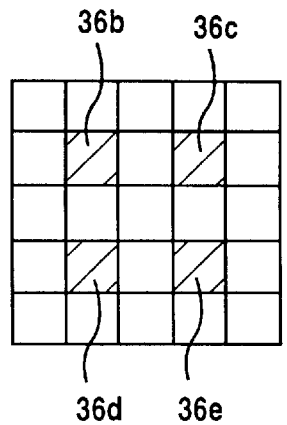
FIG. 4(C) is an illustrative view showing four (4) detection blocks utilized in a second registration determination mode.

Then, the data of the detection blocks being changed by the enable signal and shown by FIG. 4(A), FIG. 4(B) or FIG. 4(C) are applied to a detection block integration circuit 76.

Figure 5:
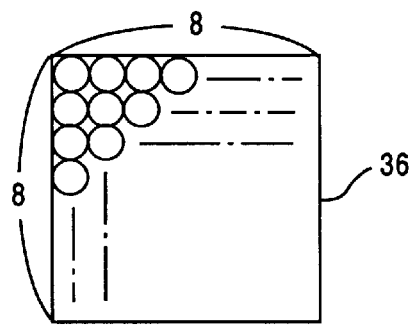
FIG. 5 is an illustrative view showing the detection blocks and pixels.

With referring to FIG. 5, an operation of the detection block integration circuit 76 will be described. A detection block 36 shown in FIG. 5 includes pixels of 64 (=8×8), for example. Values of three (3) color components constituting the color information of each pixels are assumed as Yij, (r–y)ij and (b–y)ij as shown in FIG. 5.

On such the assumption, the integrated color data of the color information (the color information data) of the pixels included in the specific detection block 36a can be evaluated by the following equations (1).

$$Y0 = \Sigma yi \, j \; GASO \; (R-Y)0 = \Sigma (r-y)ij \; GASO \; (B-Y)0 = \Sigma (b-y)ij \; GASO \tag{1}$$

The integrated color data is obtained at the initial field when the registration determining switch 42b or 42c is turned-on, and the same is stored in the representative color memory 80 via a selector 78 which is controlled by a control signal from an OR gate 81 which receives the signal b and the signal c. More specifically, when any one of the signals b and c is outputted, the integrated color data from the detection block integration circuit 76 is applied to the representative color memory 80 via the selector 78.

Furthermore, if the registration determining switch 42b is turned-on, as similar to the above, at the initial field, in response to the enable signal applied to the latch circuit 48 via the AND gate 52 and the OR gate 60, the data of the pixels of all of twenty-five (25) detection blocks 36 shown in FIG. 4(B) are applied from the latch circuit 48 to the detection block integration circuit 76. In the detection block integration circuit 76, the color information of each pixel is integrated, and therefore, integrated color data is obtainable. The integrated color data for each of the detection blocks 36 can be evaluated by the following equations (2).

$$Yxy = \Sigma yij \; GASO \; (R-Y)xy = \Sigma (r-y)ij \; GASO \; (B-Y)xy = \Sigma (b-y)ij \; GASO \tag{2}$$

The integrated color data the number of which is corresponding to the number of detection blocks 36, i.e. 25 in this embodiment shown are stored in an integrated color memory 82.

On the other hand, when the registration determining switch 42c is turned-on, at the initial field, in response to the enable signal applied by the AND gate 62 and the OR gate 60, the data of the respective pixels of the four (4) detection blocks 35b to 36e shown in FIG. 4(C) are applied from the latch circuit 48 to the detection block integration circuit 76. The integrated color data are evaluated according to the equations (2) by the detection block integration circuit 76, and thereafter, the integrated color data of the detection blocks 36b to 36e are stored in the integrated color memory 82.

Furthermore, when the tracking mode switch 42a is turned-on and the signal a is outputted, in response to the enable signal from the AND gate 74 and the OR gate 60, the data of the respective pixels of all the detection blocks 36 shown in FIG. 4(B) are applied to the detection block integration circuit 76 from the latch circuit 48. The detection block integration circuit 76 evaluates the integrated color data according to the equations (2), and the integrated color data are stored in the integrated color memory 82.

In addition, the detection block integration circuit 76 includes counters A and B (not shown) for counting the number of pixels being applied from the latch circuit 48.

Then, in this embodiment shown, if the counter A counts 64 (=8×8), the integrated color data is outputted from the detection block integration circuit 76 to the representative color memory 80. In the first registration determination mode and the object tracking mode, if the counter B counts 1600 (=8×8×25), or in the second registration determination mode, if the counter B counts 256 (=8×8×4), the integrated color data are outputted from the detection block integration circuit 76 to the integrated color memory 82.

Then, if the horizontal signal H4 and the vertical signal V4 shown in FIG. 3(B) are applied to an AND gate 86 which is connected to a latch circuit 84, the integrated color data within the representative color memory 80 is latched and applied to a correlator 88. When the horizontal signal H5 and the vertical signal V4 shown in FIG. 3(C) are applied to an AND gate 92 which is connected to a latch circuit 90, the integrated color data within the integrated color memory 82 is latched, and applied to the correlator 88. The horizontal signal H5 is outputted a plurality of times corresponding to the number of detection blocks. Therefore, in the first registration determination mode, the horizontal signal H5 is outputted twenty-five (25) times, and in the second registration determination mode, the horizontal signal H5 is outputted four (4) times.

In the correlator 88, a calculation on the basis of the integrated color data from the latch circuit 84 and the integrated color data from the latch circuit 90 is performed. That is, according to the following equation (3), absolute difference values of the integrated color data of respective color components, and a sum Dxy is calculated.

$$Dxy = |Xxy - Y0| + |(R-Y)xy - (R-Y)0| + |(B-Y)xy - (B-Y)0| \quad (3)$$

The above described calculation is performed for each detection block, whereby the Dxy, i.e. the correlation value is obtainable for each block.

Then, as similar to the selector 78, a selector 94 is controlled by the control signal from the OR gate 81, and therefore, when the signal b or the signal c is outputted, the correlation value is applied to a comparison circuit 96, and otherwise, the correlation value is applied to the motion vector generating circuit 98.

In the comparison circuit 96, the correlation value obtained for each detection block is compared with a predetermined threshold value. In the first registration determination mode, each of twenty-five (25) correlation values is compared with the predetermined threshold value, and comparison results are applied to the CPU 38. In the second registration determination mode, each of the four (4) correlation values is compared with the threshold value, and comparison results are applied to the CPU 38.

In the first registration determination mode, if a rate of detection blocks in each of which a condition that the correlation value is smaller than the threshold value with respect to all the detection blocks is more than eighty (80) percent, for example, the CPU 38 determines that the integrated color data being stored in the representative color memory 80 is to be registered as the representative color. In the second registration determination mode, when the condition that the correlation value is smaller than the threshold value is satisfied in each of all the detection blocks 36b to 36e, it is determined that the integrated color data being stored in the representative color memory 80 is to be registered. Thus, the integrated color data is determined to be effective, and the integrated color data is utilized as the representative color of the object. At this time, a determination flag to be stored in the RAM 46 is set as "1".

Otherwise, the integrated color data being stored in the representative color memory 80 can not be utilized as the representative color of the object, and the determination flag of the RAM 46 is set as "0". If the determination flag is "1", a waiting state for the operation of the object tracking is set, and if the determination flag is "0", a waiting state for the operation of next registration determination is set.

Then, when the determination flag is "1", if the tracking mode switch 42a is turned-on, the operation for the normal object tracking is performed. In the operation for the object tracking, the correlator 88 performs calculations to evaluate correlation values of the integrated color data being stored in the representative color memory 80, i.e. the representative color of the object and the integrated color data being stored in the integrated color memory 82 in succeeding fields. The correlation values are applied to the motion vector generating circuit 98 via the selector 94.

Figure 6A:
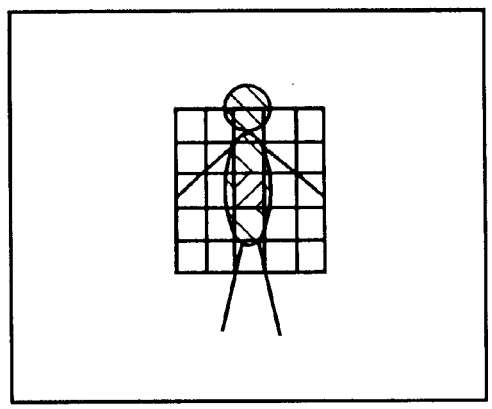
FIG. 6(A) to FIG. 6(C) are illustrative views showing an operation of generation of a motion vector and an operation of object tracking.
Figure 6B:
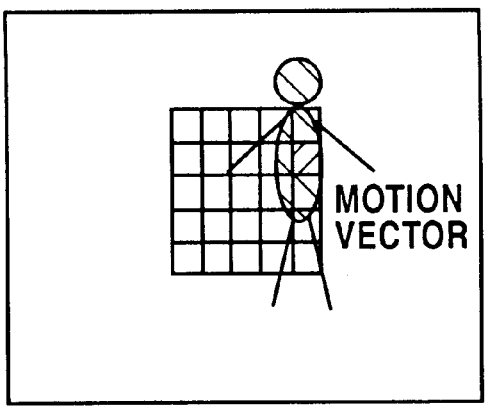
Figure 6C:
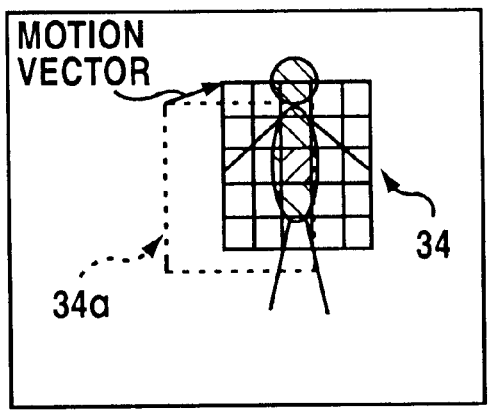

In the motion vector generating circuit 98, respective correlation values, i.e. Dxy are compared with each other, and it is determined that a center of the specific detection block 36a is moved to a position where the Dxy becomes a minimum value, whereby a motion vector indicating a moving amount and a moving direction of the object (see FIG. 6(A) and FIG. 6(B)) is obtained. In a next field, as shown in FIG. 6(C), the motion vector detection area 34 is moved by an amount and a direction defined by the motion vector.

Returning back to FIG. 1, the motion vector is applied from the motion vector detection circuit 16 to a universal head control circuit 100. The universal head control circuit 100 drives a driving device 102 on the basis of the motion vector being applied, and accordingly, the tracking operation of the camera 12 is controlled. That is, the camera 12 is controlled such that the motion vector becomes zero, i.e. a dotted-line portion 34a shown in FIG. 6(C) is moved to the motion vector detection area 34.

Next, with referring to FIG. 7 through FIG. 9, a major operation of the object tracking camera device 10 of this embodiment shown will be described.

Figure 7:
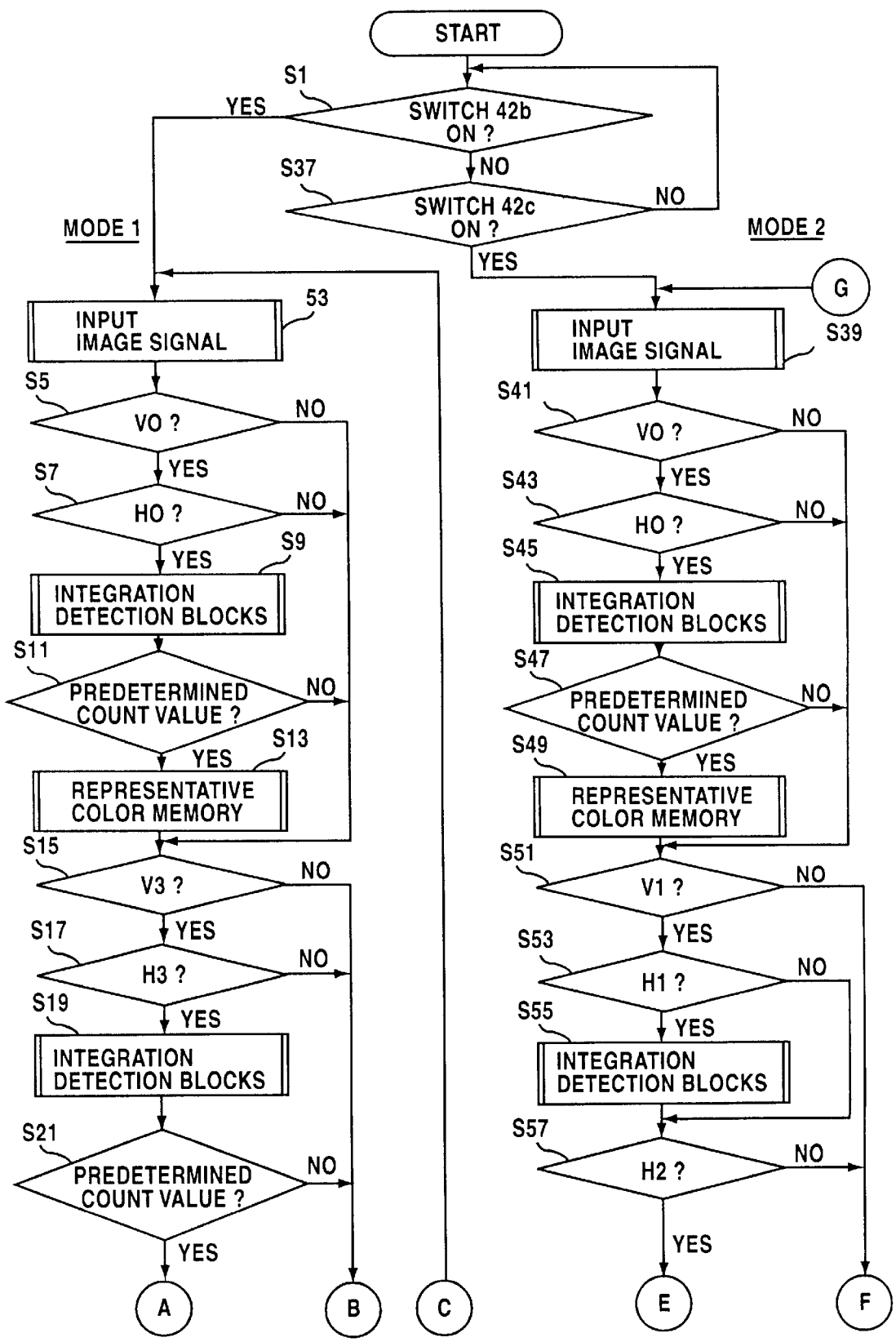
FIG. 7 is a flowchart showing a major operation of the embodiment.

In a step S1 shown in FIG. 7, it is determined whether or not the registration determining switch 42b is turned-on. If "YES", E processing for the first registration determination mode described below is performed.

More specifically, when the image signal is inputted in a step S3 and the vertical signal V0 is outputted in a step S5 and the the horizontal signal H0 is outputted in a step S7, the process proceeds to a step S9 wherein the integrated color data of the color information of the specific detection block 36a is calculated by the detection block integration circuit 76. In a step S11, it is determined whether or not the counter A (not shown) of the detection block integration circuit 76 becomes the predetermined count value. In this embodiment shown, it is determined whether or not the count value of the counter A becomes "64". If "YES", the process proceeds to a step S13 in which the integrated color data of the color information is stored in the representative color memory 80, and then, the process further proceeds to a step S15. If "NO" in the step S5, S7 or S11, the process also proceeds to the step S15.

If the vertical signal V3 is outputted in the step S15 and the horizontal signal H3 is outputted from a step S17, in a step S19, the integrated color data for each of the twenty-five (25) detection blocks 36 is calculated by the detection block integration circuit 76, and then, in a step S21, it is determined whether or not the counter B (not shown) in the detection block integration circuit 76 reaches a predetermined count value. In this embodiment shown, the predetermined count value is "1600 (=64×25)". If "YES" in a step S23 shown in FIG. 8, the integrated color data are stored in the integrated color memory B2, and then, the process proceeds to a step S25. If "NO" in the step S15, S17 or S21, the process also proceeds to the step S25.

If the vertical signal V4 is outputted in the step S25 and the horizontal signal H4 is outputted in a step S27a, in a step S29a, the integrated color data being stored in the representative color memory 80 is applied to the correlator 88 via the latch circuit 84, and then, the process proceeds to a step S31. Furthermore, if the vertical signal V4 is outputted in the step S25 and the horizontal signal H5 is outputted in a step S27b, in a step S29b, the integrated color data being stored in the integrated color memory 80 is applied to the correlator 88 via the latch circuit 90, and then, the process also proceeds to the step S31. In addition, if "NO" in the step S25, S27a or S27b, the process returns to the step S3.

In the step S31, the correlator 88 performs the correlation calculations. In this embodiment shown, for each of all the twenty-five (25) detection blocks 36, the correlation value is calculated. Next, in a step S33, as to each of the twenty-five (25) correlation values, it is determined whether or not the condition that the correlation value is smaller than the threshold value is satisfied by the comparison circuit 96. The comparison results are applied to the CPU 38, and if the condition is satisfied in each of eighty (80) percents or more detection blocks, the process proceeds to a step S35a wherein the integrated color data being stored in the representative color memory 80 is registered as the representative color of the object. That is, the object tracking camera device 10 is thereafter made as the waiting state for the operation of the object tracking.

On the other hand, in the step S33, if it is determined that the rate of the detection blocks 36 in each of which the condition that the correlation value is smaller than the threshold value is satisfied is less than eighty (80) percents, the process proceeds to a step S35b wherein the integrated color data being stored in the representative color memory 80 is not the representative color of the object, and therefore, not registered. That is, in such a case, the object tracking camera device 10 is thereafter made as the waiting state for the operation of the registration determination, and then, in the registration determination mode, the integrated color data of the representative color memory 80 is renewed, and it is determined again whether or not the integrated color data is to be registered.

Returning back to FIG. 7, if "NO" in the step S1, in a step S37, it is determined whether or not the registration determining switch 42c is turned-on. If "NO", the process returns to the step S1, and if "YES", the process for the second registration determination mode described below is executed.

More specifically, the image signal is inputted in a step S39 and the vertical signal V0 is outputted in a step S41 and the horizontal signal H0 is outputted in a step S43, in a step S45, the integrated color data of the color information of the specific detection block 36a is calculated by the detection block integration circuit 76, and then, in a step S47, it is determined whether or not the counter A (not shown) reaches a predetermined count value. In this embodiment, it is determined whether or not the counter A reaches "64". If "YES", in a step S49, the integrated color data is stored in the representative color memory 80, and then, the process proceeds to a step S651. If "NO" in the step S41, S45 or S47, the process also proceeds to the step S51.

If the vertical signal V1 is outputted in the step S51 and the horizontal signal H1 is outputted in a step S53, in a step S55, the integrated color data of the detection block 36b shown in FIG. 4(C) is calculated by the detection block integration circuit 76, and then, the process proceeds to a step S57. If "NO" in the step S53, the process also proceeds to the step S57.

Figure 8:
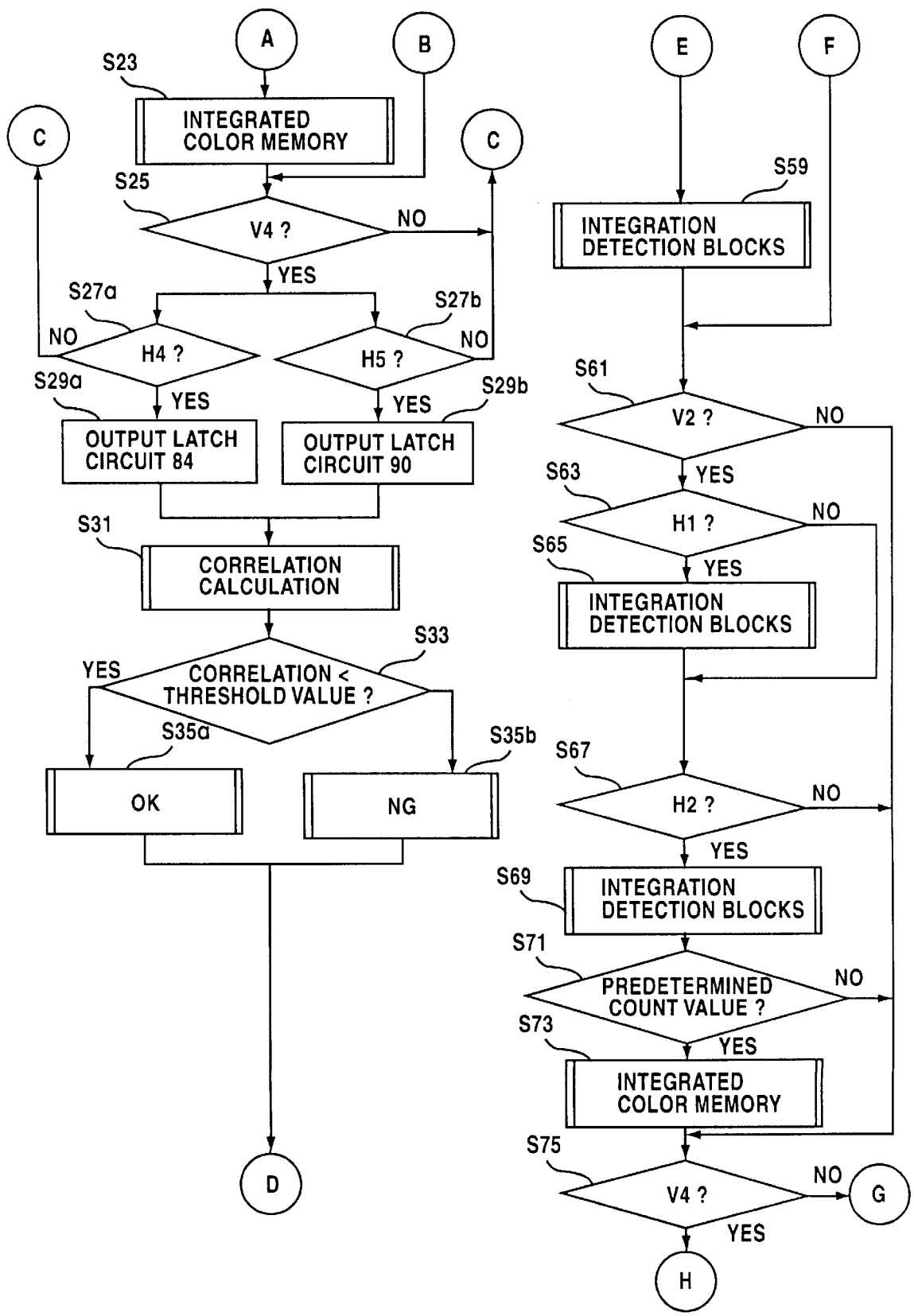
FIG. 8 is a flowchart showing steps succeeding to FIG. 7.

When the horizontal signal H2 is outputted in the step S57, in a step S59 shown in FIG. 8, the integrated color data of the detection block 36c shown in FIG. 4(C) is calculated, and then, the process proceeds to a step S61. If "NO" in the step S51 or S57, the process also proceeds to the step S61.

When the vertical signal V2 is outputted in the step S61 and the horizontal signal H1 is outputted in a step S63, in a step S65, the integrated color data of the detection block 36d shown in FIG. 4(C) is calculated, and then, the process proceeds to a step S67. If "NO" in the step S63, the process also proceeds to the step S67.

When the horizontal signal H2 is outputted in the step S67, in a step S69, the integrated color data of the detection block 36e shown in FIG. 4(C) is calculated, and then, the process proceeds to a step S71.

In the step S71, it is determined whether or not the counter B (not shown) of the detection block integration circuit 76 becomes a predetermined count value. In this embodiment shown, the predetermined count value is "256 (=64×4)". If "YES", in a step S73, the integrated color data are stored in the integrated color memory 82, and then, the process proceeds to a step S75. If "NO" in the step S61, S67 or S71, the process also proceeds to the step S75.

Figure 9:
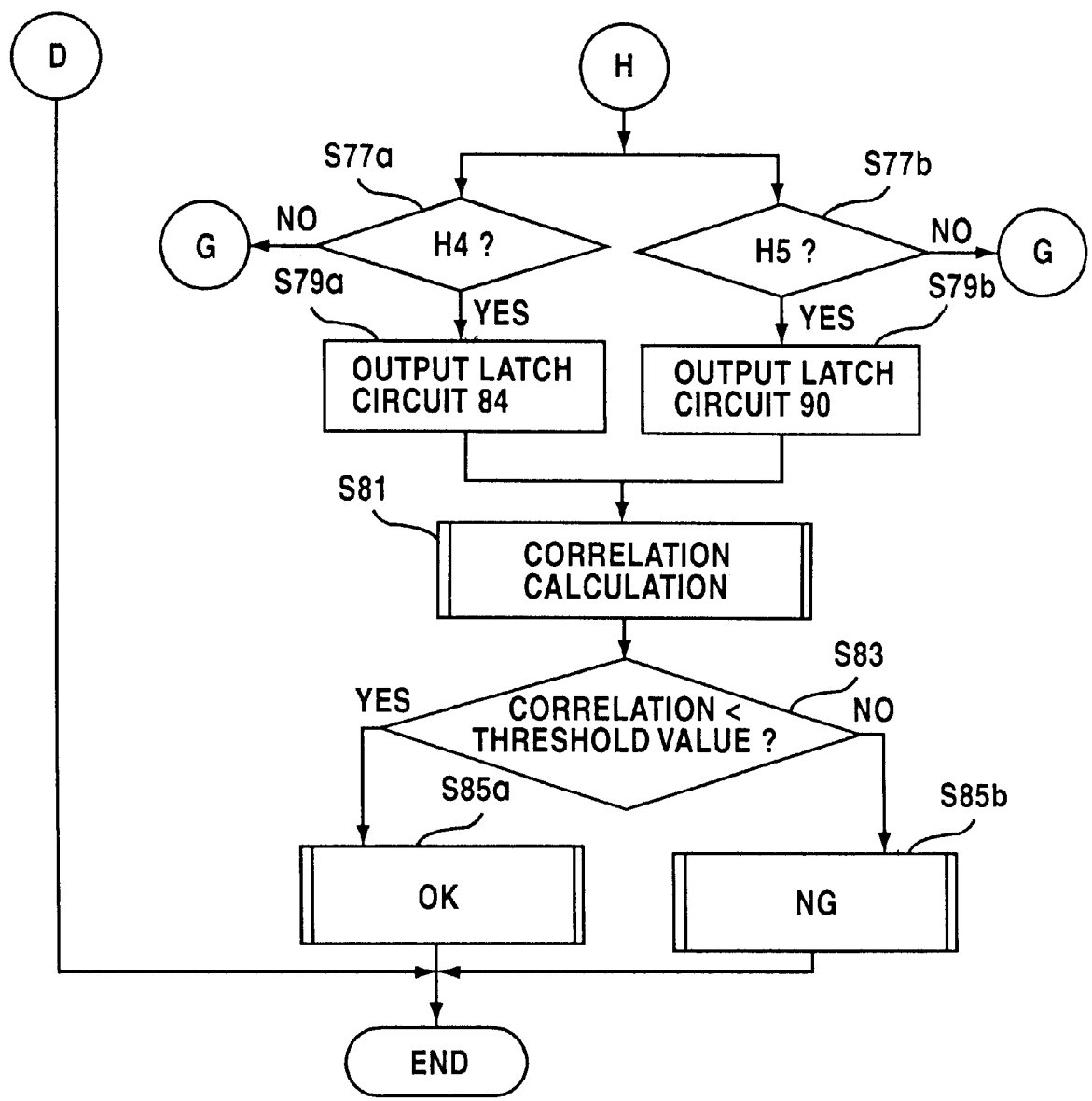
FIG. 9 is a flowchart showing steps succeeding to FIG. 8.

The vertical signal V4 is outputted in the step S75 and the horizontal signal H4 is outputted in a step S77a shown in FIG. 9, in a step S79a, the integrated color data being stored in the representative color memory 80 are outputted to the correlator 88 via the latch circuit 84, and then, the process proceeds to a step S81. In addition, the vertical signal V4 is outputted in the step S75 and the horizontal signal H5 is outputted in a step S77b, the process proceeds to a step S79b wherein the integrated color data being stored in the integrated color memory 82 are applied to the correlator 88 via the latch circuit 90, and then, the process proceeds to the step S81. If "NO" in the step S75, S77a or S77b, the process returns to the step S39.

In the step S81, the correlation calculation is performed by the correlator 88. In this embodiment shown, as to each of the four (4) detection blocks 36b to 36e, the correlation value is obtained, and then, in a step S83, each of the correlation values is compared with a predetermined threshold value in the comparison circuit 96. The comparison results are applied to the CPU 38 which determines whether or not each of the four (4) correlation values satisfies the condition that the correlation value is smaller than the threshold value, and if "YES", the process proceeds to a step S85a. In the step S85a, as similar to the step S35a, the integrated color data being stored in the representative color memory 80 is registered as the representative color of the object.

On the other hand, in the step S83, if there is a correlation value by which the condition that the correlation value is smaller than the threshold value is not satisfied, the process proceeds to a step S85b wherein, as similar to the step S35b, the integrated color data being stored in the representative color memory 80 does not become the representative color of the object, and therefore, the integrated color data is not registered.

According to the above described embodiment, since it is possible to select the first registration determination mode or the second registration determination mode as the registration determination mode, it is possible to determine whether or not the integrated color data is to be registered by taking the state of the object and etc. into consideration.

In addition, in the above described embodiment, two determination modes are switched; however, only one of the first registration determination mode and the second registration determination mode may be incorporated. By adopting the second registration determination mode, it is possible to make a circuit scale to be small and it is possible to set the registration color with higher reliability.

In addition, in the second registration determination mode in the above described embodiment, the registration determination is performed with utilizing the detection blocks 36b to 36e adjacent to the specific detection block 36a; however, arbitrary detection blocks around the specific detection block 36a may be utilized for determining the registration.

Furthermore, in the above described embodiment, as the color information, three (3) color components of Y, R-Y and B-Y signals are utilized. Such color components are effective for processing a video signal. Otherwise, in a case where a signal from a primary-system CCD is to be processed, three (3) color components of R, G and B signals may be used, and in a case where a signal from a CCD in which a mosaic filter of complementary colors is to be processed, it is preferable that three (3) color components of Y, Cr (=R-2G) and Cb (=B-2G) signals are used.

Furthermore, other three (3) color components of R/Y, G/Y and B/Y signals obtained by dividing the R, G and B signals by the Y signal may be utilized. By normalizing by dividing the color components by the Y signal, an influence of a brightness due to illuminations can be removed, and therefore, if there are two colors having the same hue and the same saturation, the two colors can be regarded as the same color.

In addition, the threshold value may be arbitrarily set in accordance with a degree of the correlation being required and the kind of color components constituting the color information.

Furthermore, in the above described embodiment, a case where the motion vector detection circuit 16 is applied to the object tracking camera device 10; however, it is needless to say that the motion vector detection circuit according to the present invention can be applied to a video camera having picture stabilization function.

Since an object tracking camera device 10 of another embodiment according to the present invention is the same or similar to the object tracking camera device 10 shown in FIG. 1 except for structure of a motion vector detection circuit 114, a duplicate description will be omitted here.

Figure 10:
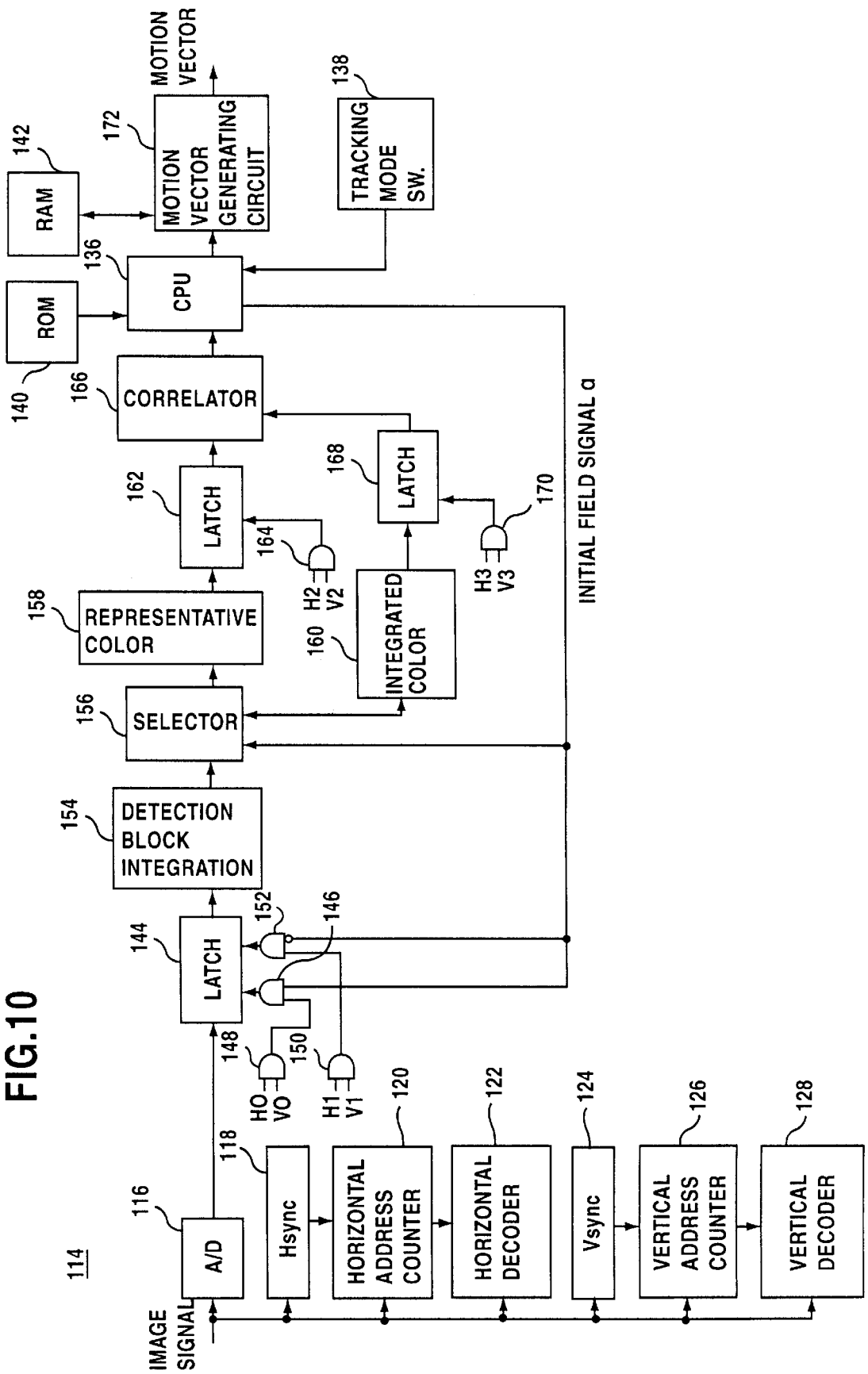
FIG. 10 is a block diagram showing one example of a motion vector detection circuit of another embodiment according to the present invention.

The motion vector detection circuit 114 shown in FIG. 10 includes an A/D converter 116 which converts an image signal into digital data for each pixel. The digital data is data of Y, R-Y and B-Y signals, for example, The image signal is also applied to an Hsync separation circuit 118 and horizontal address counter 120 in which the number of pixels in the horizontal direction is counted according to the image signal. The horizontal address counter 120 is reset for each horizontal line on the basis of the horizontal synchronization signal from the Haync separation circuit 118. An output from the horizontal address counter 120 is applied to a horizontal decoder 122 from which four (4) kinds of horizontal signals H0 to H3 are outputted.

The image signal is also applied to a Vsync separation circuit 124 and a vertical address counter 126 in which the number of pixels in the vertical direction is counted according to the image signal. The vertical address counter 126 is reset for each field on the basis of the vertical synchronization signal from the Vsync separation circuit 124. An output from the vertical address counter 126 is applied to the vertical decoder 128 from which three (3) kinds of vertical signals V0 to V2 are outputted.

Figure 11A:
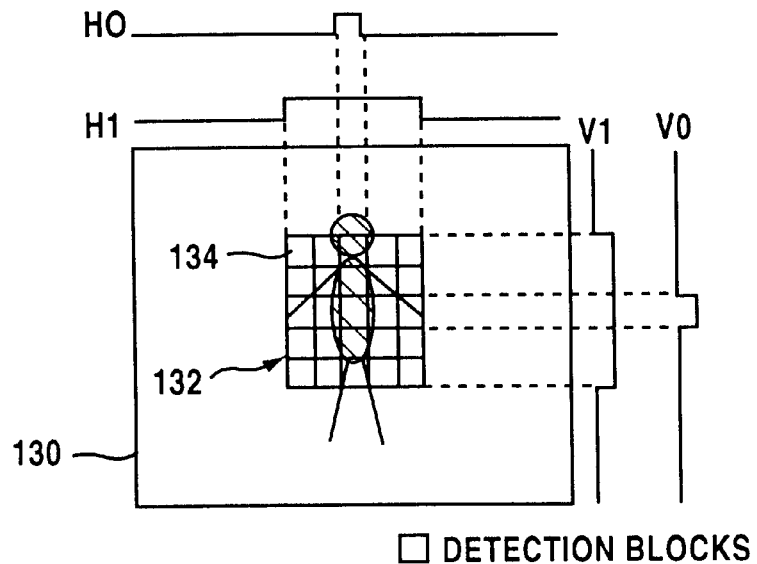
FIG. 11(A) is an illustrative view showing a horizontal signal and a vertical signal for producing an enable signal for a latch circuit 44.
Figure 11B:
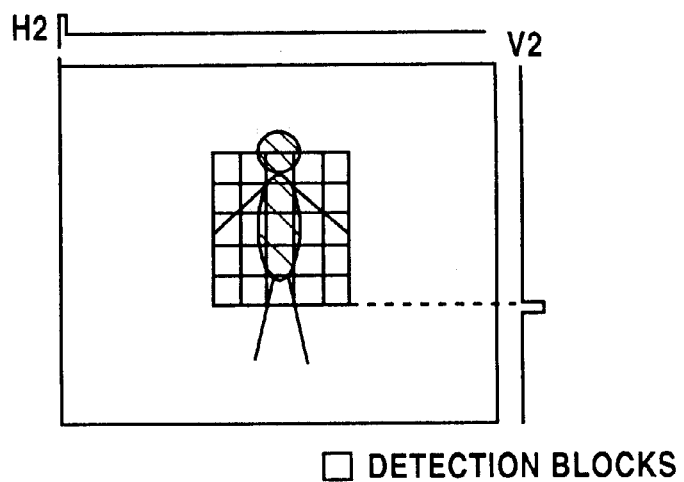
FIG. 11(B) is an illustrative view showing a horizontal signal and a vertical signal for producing an enable signal for a latch circuit 62.
Figure 11C:
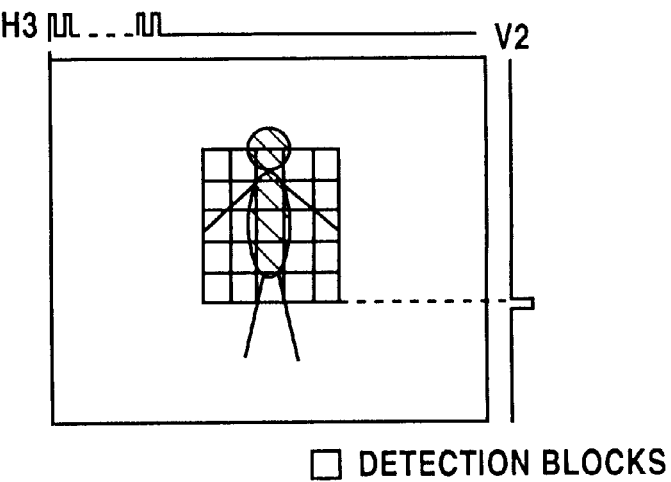
FIG. 11(C) is an illustrative view showing a horizontal signal and a vertical signal for producing an enable signal for a latch circuit 68.

The horizontal signals H0 to H3 and the vertical signals V0 to V2 are shown in FIG. 11(A) to FIG. 11(C).

In FIG. 11, a screen 130 of the view finder 14 of the camera 12 is also illustrated, and a motion vector detection area 132 displayed on the screen 130 is divided into a plurality of (twenty-five (25) in this embodiment shown) detection blocks 134.

The motion vector detection circuit 114 further includes a CPU 136 to which a tracking mode switch 138 for setting an object tracking mode is connected. When the tracking mode switch 138 is turned-on, an initial field signal a is outputted from the CPU 136 at a field just after an operation of the object tracking is started, i.e. initial field.

Furthermore, a ROM 140 and a RAM 142 are connected to the CPU 136. In the ROM 140, a program for controlling an operation of the motion vector detection circuit 114 is stored in advance, and in the RAM 142, information indicating whether or not respective detection blocks 134 are the same color detection blocks, a large block number if the detection blocks 134 are the same color detection blocks, a change flag and etc. are stored.

Then, the digital data of the image signal is latched by a latch circuit 144 on the basis of the horizontal signals H0 and H1, and the vertical signals V0 and V1, and the initial field signal a.

More specifically, when the tracking mode switch 138 is turned-on, the initial field signal a is outputted to an AND gate 146 during the initial field. At the initial field, if the horizontal signal H0 and the vertical signal V0 are outputted, an enable signal is applied to the latch circuit 144 via an AND gate 148 and the AND gate 146. In response to the enable signal from the AND gate 146, the latch circuit 144 latches data for each pixel of a specific detection block 134a shown in FIG. 12(A). As the specific detection block 134a, in this embodiment shown, a detection block 134 at a center of the motion vector detection area 132 is selected.

Furthermore, fields after the initial field, no initial field signal a is outputted. Therefore, in each of the fields after the initial field, when the horizontal signal H1 and the vertical signal V1 are outputted, an enable signal is outputted to the latch circuit 144 via AND gates 150 and 152. In response to the enable signal from the AND gate 152, the latch circuit 144 latches data of respective pixels of each of the twenty-five (25) detection blocks 134 shown in FIG. 12(A).

Then, from the latch circuit 144, data of the specific detection block 134a of FIG. 12(A) or the data of all the detection blocks 134 shown in FIG. 12(B) is applied to a detection block integration circuit 154.

With referring to FIG. 13, an operation of the detection block integration circuit 154 will be described. Each of the detection blocks 134 shown in FIG. 13 includes 64 (=8×8) pixels. It is assumed that the respective values of three (3) color components constituting color information of each of the pixels are Yij, (r−y)ij and (b−y)ij as shown in FIG. 13.

Then, integrated color data of the color information of the pixel included in the specific detection block 134a can be evaluated according to the following equations (4).

$$Y0=\Sigma yij\ GASO\ (R-Y)0=\Sigma(r-y)ij\ GASO\ (B-Y)0=\Sigma(b-y)ij\ GASO \quad (4)$$

The integrated color data can be obtained at the initial field. A selector 156 is controlled by the initial field signal a, and therefore, at a time that the initial field signal a is outputted, the integrated color data from the detection block integration circuit 154 is stored in a representative color memory 158 via the selector 156 as a representative color.

In the fields after the initial field, on the basis of the enable signal applied from the AND gate 152, the data of the pixels of the twenty-five (25) detection blocks 134 shown in FIG. 12(B) are applied to the detection block integration circuit 154 from the latch circuit 144. In the detection block integration circuit 154, as to each of the twenty-five (25) detection blocks 134, the color information integrated, and therefore, integrated color data is obtainable. The integrated color data obtained by integrating the color information of the pixels of each of the detection blocks 134 can be evaluated according to the following equations (5).

$$Yxy=\Sigma yij\ GASO\ (R-Y)xy=\Sigma(r-y)ij\ GASO\ (B-Y)xy=\Sigma(b-y)ij\ GASO( \tag{5}$$

Since the initial field signal a is not outputted in the fields after the initial field, the integrated color data of the all the detection blocks 134 are stored in an integrated color memory 160 via the selector 156.

In addition, although not shown, the detection block integration circuit 154 includes a counter for counting the number of pixels applied from the latch circuit 144. Then, in this embodiment shown, if the counter counts a predetermined value, "64 (=8×8)" at the initial field, the integrated color data, is outputted from the detection block integration circuit 154 to the representative color memory 158. As similar thereto, in each of the fields after the initial field, if the counter (not shown) counts a predetermined count value, i.e. "1600 (=8×8×25)", the integrated color data are outputted from the detection block integration circuit 154 to the integrated color memory 160.

Then, if the horizontal signal H2 and the vertical signal V2 shown in FIG. 11(B) are applied to an AND gate 164 which is connected to a latch circuit 162, the integrated color data within the representative color memory 158 is latched by the latch circuit 152, and then, applied to a correlator 166. If the horizontal signal H3 and the vertical signal V2 shown in FIG. 11(C) are applied to an AND gate 170 which is connected to a latch circuit 168, the integrated color data within the integrated color memory 160 are latched by the latch circuit 168, and then, applied to the correlator 166. The number of the horizontal signal H3 is corresponding to the number of detection blocks. Therefore, twenty-five (25) horizontal signals H3 are outputted.

In the correlator 166, calculations of the integrated color data from the latch circuit 162 and the integrated color data from the latch circuit 168 are performed. That is, according to the following equation (6), an absolute difference value is calculated for each of the integrated color data of the color components, and a sum Dxy is calculated.

$$Dxy=|Yxy-Y0|+|(R-Y)xy-(R-Y)0|+|(B-Y)xy-(B-Y)0| \tag{6}$$

Such the calculation is performed for each of the detection blocks 134, and therefore, the Dxy, i.e. a correlation value is obtained for each of the detection blocks 134. The correlation value Dxy is applied to the CPU 136.

Figure 14A:
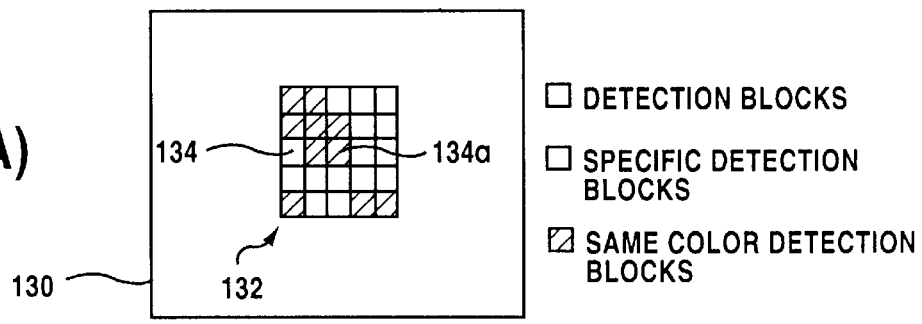
FIG. 14(A) to FIG. 14(C) are illustrative views showing an operation of generation of a motion vector and an operation of object tracking.

Although an operation of the CPU 136 will be described in detail, the CPU 136 compares the correlation value of each of the detection blocks with a predetermined threshold value. A detection block 134 in which a condition that the correlation value is smaller than the threshold value is satisfied is determined as a same color detection block which is regarded as a detection block having the same color as that of the specific detection block 134a. The same color detection blocks are indicated by slanting lines in FIG. 14(A). By detecting such the same color detection block, a large block which is constituted by coupling the same color detection blocks is detected. If a plurality of large blocks are detected within the motion vector detection area 132, a large block having a largest area or a maximum area is selected from the large blocks. Furthermore, a gravity of the large block having the largest area is evaluated, and a position data of the gravity of the large block is applied to a motion vector generating circuit 172.

Figure 14B:
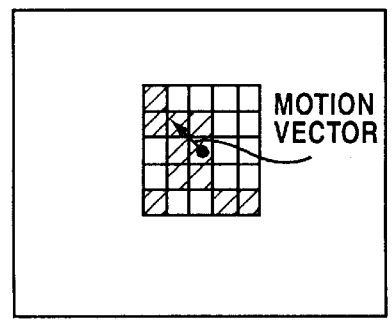
Figure 14C:
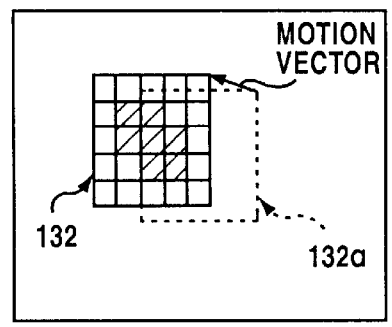

In the motion vector generating circuit 172, a motion vector is generated as shown in FIG. 14(B) on the basis of the position data of the gravity, and in a next field, as shown in FIG. 14(C), the motion vector detection area 132 is moved by an amount and direction of the motion vector.

Next, with referring to FIG. 15 through FIG. 17, a major operation of the object tracking camera device 10 with utilizing the motion vector detection circuit 114 will be described.

Figure 15:
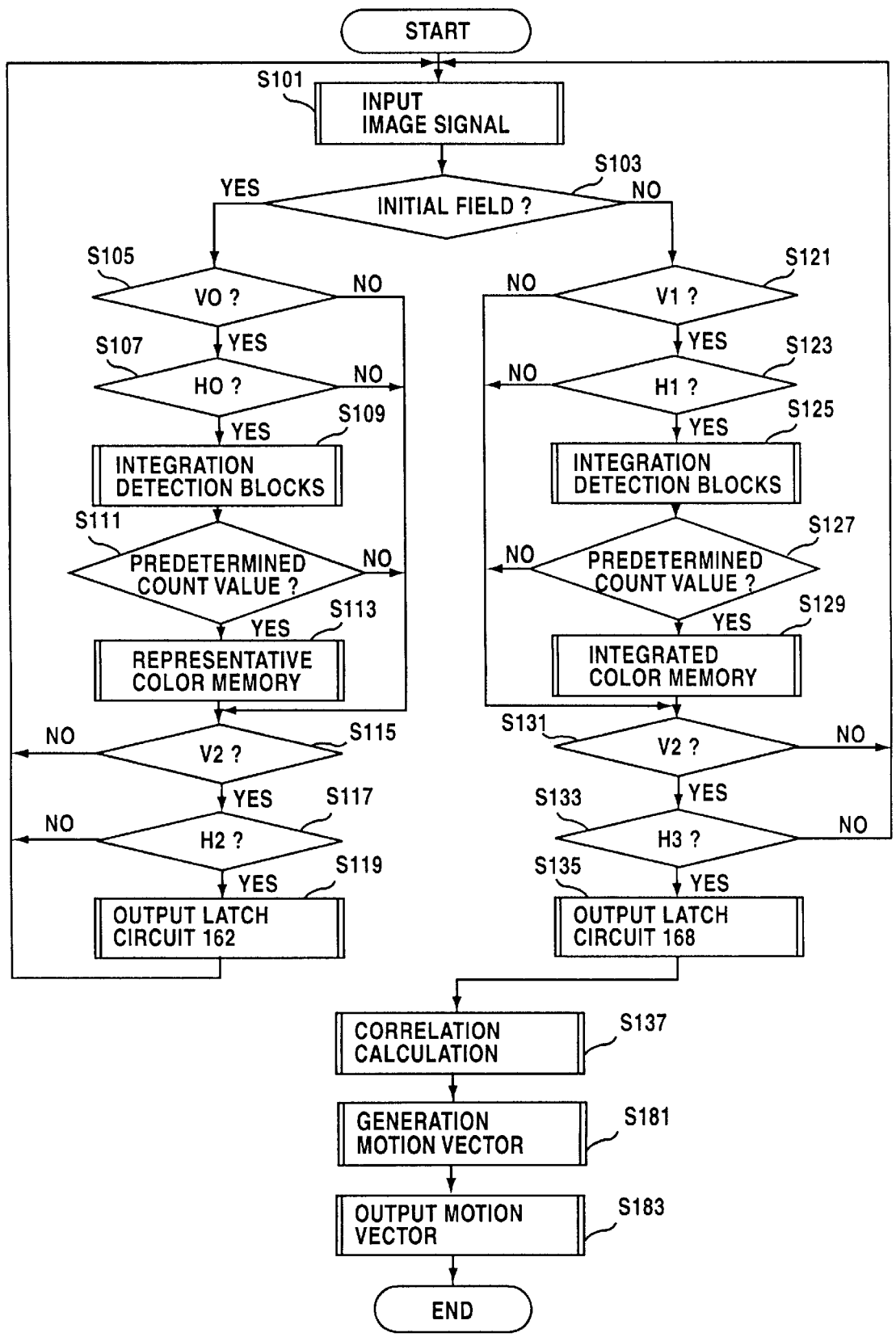
FIG. 15 is a flowchart showing a major operation of the embodiment.

In a step S101 shown in FIG. 15, the image signal is first inputted, and then, in a step S103, it is determined whether or not a field is the initial field. The field just after the operation of the object tracking is started in response to the turning-on of the tracking mode switch 138 is determined as the initial field, and otherwise the field is not determined as the initial field.

If "YES" in the step S103, when the vertical signal V0 is outputted in a step S105 and the horizontal signal H0 is outputted in a step S107, in a step S109, the integrated color data of the color information of the detection block 134a is calculated by the detection block integration circuit 154. In a step S111, it is determined whether or not the counter (not shown) in the detection block integration circuit 154 reaches the predetermined count value, e.g. "64". If "YES" in the step S111, in a step S113, the integrated color data of the color information is stored in the representative color memory 158, and then, the process proceeds to a step S115. If "NO" in the step S105, S107 or S111, the process also proceeds to the step S115.

When the vertical signal V2 is outputted in the step S115 and the horizontal signal H2 is outputted in a step S117, in a step S119, the integrated color data being stored is the representative color memory 158 is applied to the correlator 166 via the latch circuit 162, and then, the process returns to the step S101. If "NO" in the step S115 or S117, the process also returns to the step S101.

Then, if the image signal is inputted in the step S101, and if "NO" is determined in the step S103, the process proceeds to a step S121.

When the vertical signal V1 is outputted in the step S121 and the horizontal signal H1 is outputted in a step S123, in a step S126, the integrated color data of each of the respective detection blocks 134 is calculated by the detection block integration circuit 154, and then, the process proceeds to a step S127 wherein it is determined whether or not the counter (not shown) within the detection block integration circuit reaches the predetermined count value, e.g. "1600". If "YES" in a step S129, the integrated color data are stored in the integrated color memory 160, and then, the process proceeds to a step S131. If "NO" in the step S121, S123 or S127, the process also proceeds to the step S131.

When the vertical signal V2 is outputted in the step S131 and the horizontal signal H3 is outputted in a step S133, in a step S135, the integrated color data being stored in the integrated color memory 160 are applied to the correlator 166 via the latch circuit 168, and then, the process proceeds to a step S137. If "NO" in the step S131 or S133, the process returns to the step S101.

Figure 16:
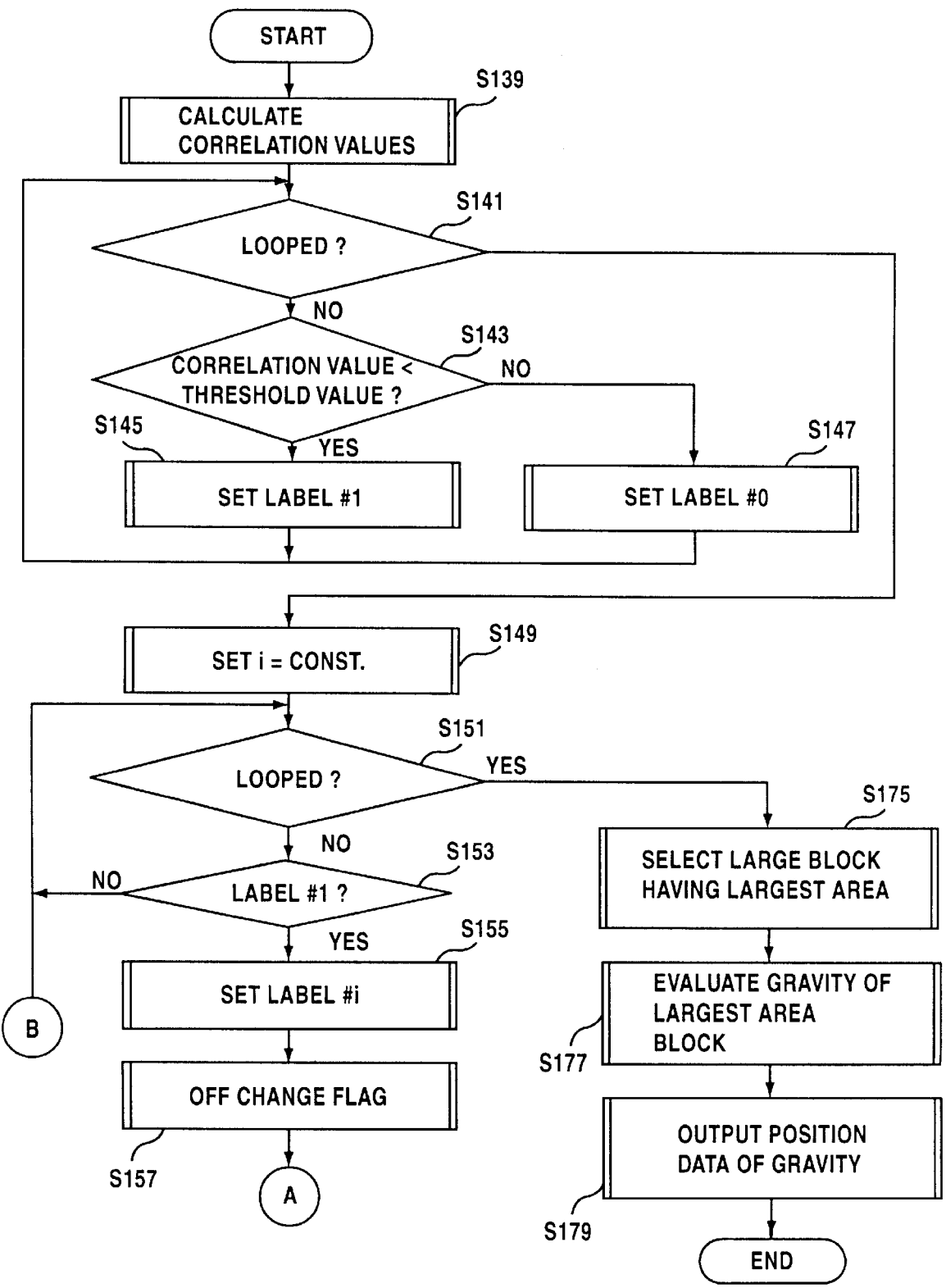
FIG. 16 is a flowchart showing an operation for a correlation calculation.
Figure 17:
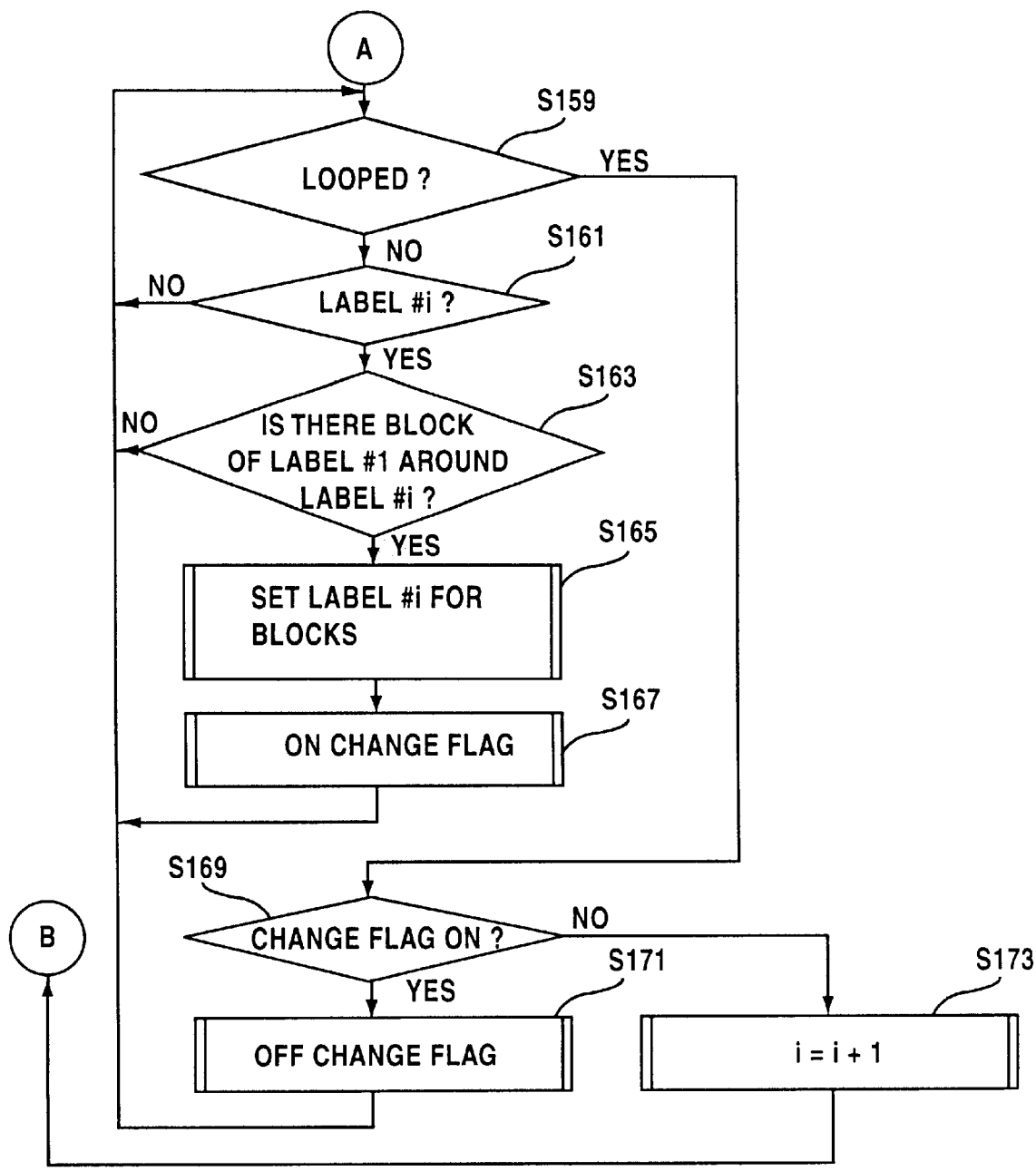
FIG. 17 is a flowchart showing steps succeeding to FIG. 16.
Figure 18A:
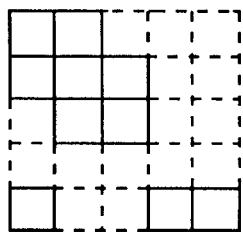
FIG. 18(A) to FIG. 18(H) are illustrative views showing the correlation calculation.

In the step S137, the correlation calculations as shown in FIG. 16 and FIG. 17 are performed. More specifically, first, in a step S139 shown in FIG. 16, the correlation value Dxy is calculated for each of the detection blocks by the correlator 166 with utilizing the above described equation (6). Then, in a step S141, it is determined whether or not the succeeding steps have been looped by times corresponding to the number of detection blocks. In this embodiment shown, it is determined whether or not the succeeding steps have been looped twenty-five (25) times. If "NO", in a step S143, the CPU 136 determines whether or not the condition that the correlation value is smaller than the threshold value is satisfied in each of the detection blocks 134. If "YES" is determined, the detection block in which the condition is satisfied is determined as the same color detection block, and then, in a step S145, a label #1 is set for the detection block 134, and then, the process returns to the step S141. If "NO" is determined in the step S143, it is determined that the detection block is not the same color detection block, and a label #0 is set for the detection block, and then, the process returns to the step S141. These steps are executed for each of all the detection blocks 134, and therefore, results as shown in FIG. 18(A) can be obtained. If the above described steps have been executed for each of the detection blocks 134, "YES" is determined in the step S141, and then, a classification of large blocks is performed with utilizing the label.

First, in a step S149, i=const is set. As "i", an arbitrary value may be set, and in this embodiment shown, i=5 is set.

Figure 18B:
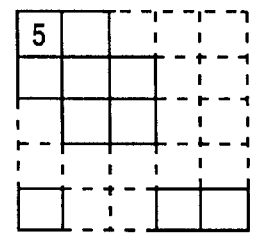

Next, in a step S151, it is determined whether or not succeeding steps have been executed by times corresponding to the number of detection blocks. As similar to the step S141, in this embodiment shown, it is determined whether or not the succeeding steps have been executed twenty-five (25) times. If "No", in a step S153, it is determined whether or not the label attached to the detection block 134 is #1, that is, it is determined whether or not the detection block 134 is the same color detection block. If "NO", the process returns to the step S151, and if "YES", the process proceeds to a step S155 wherein the label #i is set for the detection block 134 of the label #1. In this embodiment shown, as shown in FIG. 18(B), the label #5 is set. Then, in a step S157, the change flag is turned-off, and the process proceeds to a step S159 shown in FIG. 17. Thereafter, the large block of the label #5 is detected.

Figure 18C:
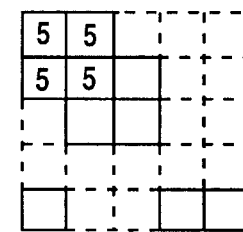

In the step S159, it is determined whether or not succeeding steps have been executed by times corresponding to the number of detection blocks. As similar to the step S151, in this embodiment shown, it is determined whether or not the succeeding steps have been executed twenty-five (25) times. If "NO" is determined, in a step S161, it is determined whether or not the label of the detection block 134 is #i. That is, it is determined whether or not the label #5 is attached to the detection block 134. If "YES", in a step S163, it is determined whether or not there is the detection block having the label #1 around the detection block having the label #i. If "YES" in a step S165, the label #i is set for the detection block. In this embodiment shown, as shown in FIG. 18(C), the label #5 is attached to the detection blocks 134 around the detection block having the label #5. Then, in a step S167, the change flag is turned-on, and then, the process returned to the step S159. In addition, if "NO" in the step S161 or S163, the process also returns to the step S159. Therefore, until "YES" is determined in the step S159, the steps of S161 to S167 are repeated, and the label #1 is attached to the detection block of the same color. Then, if "YES" in the step S159, the process proceeds to a step S169.

Figure 18D:
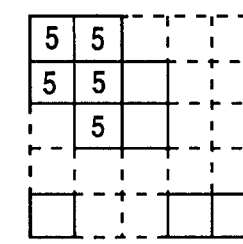
Figure 18E:
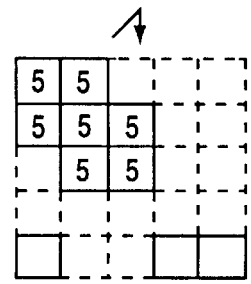

It is determined whether or not the change flag is turned-on in the step S169, and if "YES" is determined, the change flug is turned-off in a step S171, and then, the process returns to the step S159. Therefore, it is determined again whether or not the label is #i (=#5, in this embodiment shown) for respective detection blocks 134. At such second label detection, if there is no detection block having the label #1 around the detection block having the label #5, the turning-off of the change flug is maintained, and then, the process proceeds to the step S169. On the other hand, at the second label detection, if there is a detection block having the label #1 around the detection block having the label #5, the turning-on of the change flug is maintained, and then, the process proceeds to the step S169 so as to execute a third label detection. Then, until the step S169 is executed while the change flug is turned-off, the above described steps S159 to S171 are repeatedly executed. Thus, as shown in FIG. 18(D) and FIG. 18(E), the large blocks having the label #5 are formed.

Then, If "NO" becomes to be determined in the step S169, in a step S173, "i" is incremented (i=i+1), and then, the process returns to the step S151.

Figure 18F:
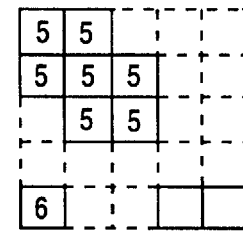
Figure 18G:
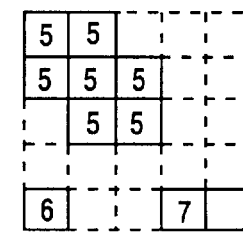
Figure 18H:
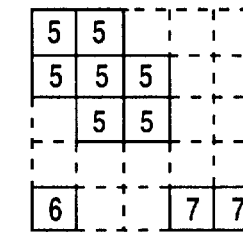

Thereafter, the processing similar to the above described processing is repeated. That is, the large block having the label #6 is formed, and the large block having the label #7 is further formed (FIG. 18(F) to FIG. 18(H)). Then, large block is searched for the label #8; however, there is no detection block having the label #1 already, the process proceeds to a step S175 with looping the steps S151 and S153 and without detection the large block of the label #8.

In the step S175, a large block having a largest area is selected out of the plurality of large blocks. At this time, it is possible to know which is the large block having the largest area by counting the number of detection blocks having the same label. Next, in a step S177, the gravity of the large block having the largest area is evaluated. More specifically, the gravity is evaluated by respectively dividing a total of X coordinates and a total of Y coordinates of respective detection blocks 134 included in the large block having the largest area by the number of detection blocks.

Then, in a step S179, the position data of the gravity of the large block having the largest area is outputted to the motion vector generating circuit 172.

Returning back to FIG. 15, in a step S181, a motion vector of a moving amount corresponding to a distance from a center of the specific detection block 134a and the gravity of the large block having the largest area is generated by the motion vector generating circuit 172, and the motion vector is outputted to the universal head control circuit 100 in a step S183.

Thus, in a case where an area of the object is small with respect to the screen 130 and there is only one same color detection block within the motion vector detection area 132, it is determined that the center of the specific detection block 134a, i.e. the motion vector detection area 132 is moved to the gravity of the same color detection block. Furthermore, in a case where the area of the object is large with respect to the screen 130 and the same color detection blocks occupy a large area of the motion vector detection area 132, it is determined that the center of the specific detection block 134a is moved to the gravity of the large block constituted by the same color detection blocks. Furthermore, in a case where the same color detection blocks are divided into a plurality of large blocks with respect to the motion vector detection area 132, it is determined that the center of the specific detection block 134*a* is moved to the gravity of the large block having the largest area. The moving amount and direction of the specific detection block 134*a* are thus detected in the above described manners, the motion vector is outputted.

On the basis of the motion vector, the operation of the object tracking of the camera 12 is controlled. In other words, the motion of the object is detected as the movement of the specific detection block 134*a* within the motion vector detection area 132, and the direction of the camera 12 is controlled so as to track the specific detection block 134*a*.

Figure 19:
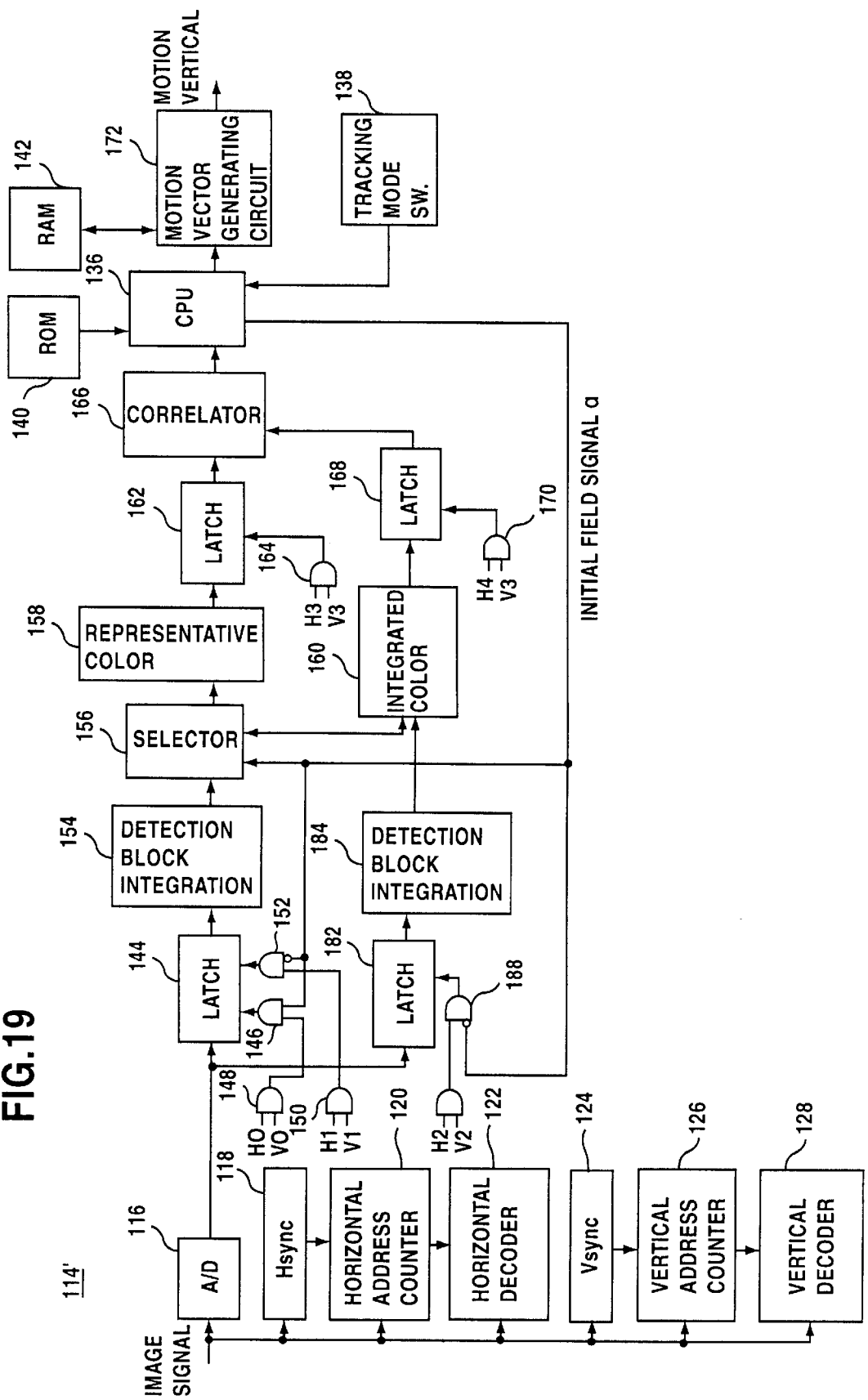
FIG. 19 is a block diagram showing another example of the motion vector detection circuit.

Furthermore, instead of the above described motion vector detection circuit 114, a motion vector detection circuit 114' shown in FIG. 19 may be utilized for the object tracking camera device 10. The motion vector detection circuit 114 utilizes a system in which other detection blocks are overlaid on the detection blocks 134.

Figure 20:
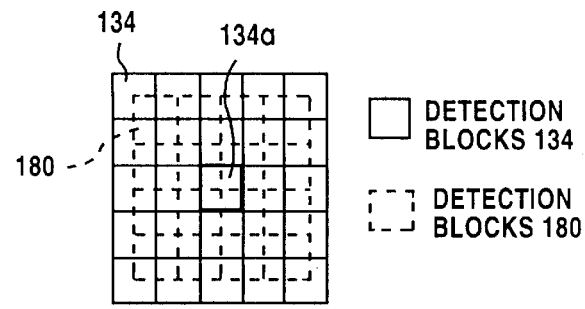
FIG. 20 is an illustrative view showing detection blocks utilized in FIG. 19 circuit.

More specifically, as shown in FIG. 20, detection blocks 180 indicated by dotted lines are arranged in overlaying on the detection blocks 134 similar to that of FIG. 10 embodiment. The number of detection blocks 134 is twenty-five (25), and the number of detection blocks 180 is sixteen (16). An area of each detection block 134 and an area of each detection block 180 are equal to each other, and a degree of superpose of the detection blocks 134 and 180 is approximately a quarter (¼) of an area of the detection block 134 (180) in this embodiment shown.

When the detection blocks are superposed as shown in FIG. 20, distances between the specific detection block 134*a* existing at the center of the motion vector detection area and the respective detection blocks 180 existing upper, lower, left and right of the detection block 134*a* become to be equal to each other, and distances between the specific detection block 134*a* and respective detection blocks 180 at left upper, right upper, left lower and right lower becomes to be equal to each other. That is, since it is possible to arrange detection blocks 180 in symmetry with respect to the specific detection block 134*a*, it is possible to detect a motion vector in any direction with the same accuracy.

The motion vector detection circuit 114' is constructed by adding a latch circuit 182, a detection block integration circuit 184, and AND gates 186 and 188 to the motion vector detection circuit 114 shown in FIG. 10. The structure of other portions are similar to that of the motion vector detection circuit 114, and therefore, a duplicate description will be omitted here.

In the motion vector detection circuit 114', when the horizontal signal H2 and the vertical signal V2 are outputted to the AND gate 186 at a field in which no initial filed signal a is outputted, i.e. each of fields after the initial field, an enable signal is applied to the latch circuit 182 via the AND gates 186 and 188. In response to the enable signal, the latch circuit 182 latches digital data of the respective detection blocks 180 being outputted from the A/D converter 116, and then, in the detection block integration circuit 184, calculations similar to that of the above described detection block integration circuit 154 are performed. Integrated color data which are calculation results in the detection block integration circuit 184 are stored in the integrated color memory 160. Therefore, in the integrated color memory 160, two kinds of integrated color data of the detection blocks 134 and the detection blocks 180 are stored.

Figure 21A:
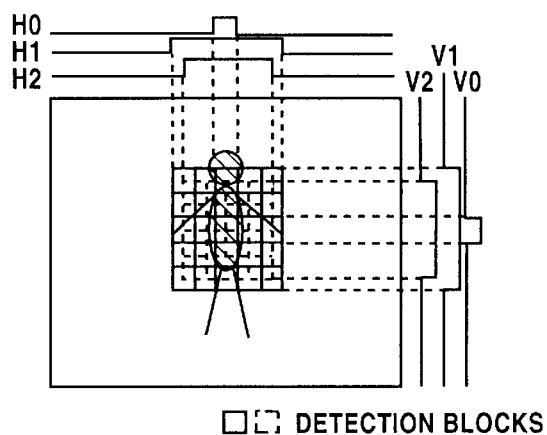
FIG. 21(A) is an illustrative view showing a horizontal signal and a vertical signal for producing enable signals for latch circuits 44 and 82.
Figure 21B:
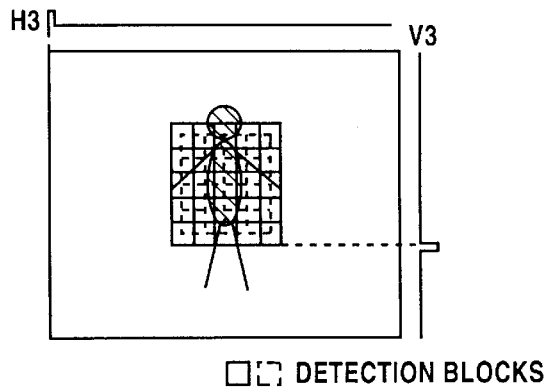
FIG. 21(B) is an illustrative view showing a horizontal signal and a vertical signal for producing an enable signal for a latch circuit 62.
Figure 21C:
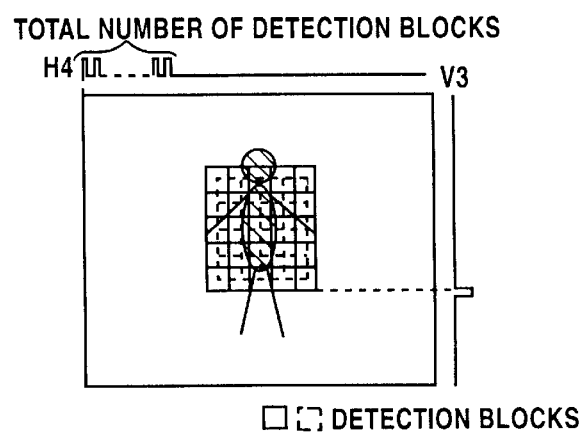
FIG. 21(C) is an illustrative view showing a horizontal signal and a vertical signal for producing an enable signal for a latch circuit 68.

In addition, as shown in FIG. 21(A) to FIG. 21(C), the horizontal signals H0 to H4 are outputted from the horizontal decoder 122, and the vertical signals V0 to V3 are outputted from the vertical decoder 128.

Furthermore, the horizontal signal H3 and the vertical signal V3 are applied to the AND gate 164 connected to the latch circuit 162 as shown in FIG. 21(B), and the horizontal signal H4 and the vertical signal V3 are applied to the AND gate 170 connected to the latch circuit 168 as shown in FIG. 21(C). The number of the horizontal signals H4 is equal to the number of the detection blocks 41 (=25+16, in this embodiment shown).

Furthermore, the detection block integration circuit 184 includes a counter (not shown) as similar to the counter of the detection block integration circuit 154, and if the count value of the counter (not shown) becomes a predetermined value, e.g. "1024 (=8×8×16)", the integrated color data are applied from the detection block integration circuit 184 to the integrated color memory 160.

With referring to FIG. 22, a major operation of the object tracking camera device 10 which utilizes the motion vector detection circuit 114' will be described.

Figure 22:
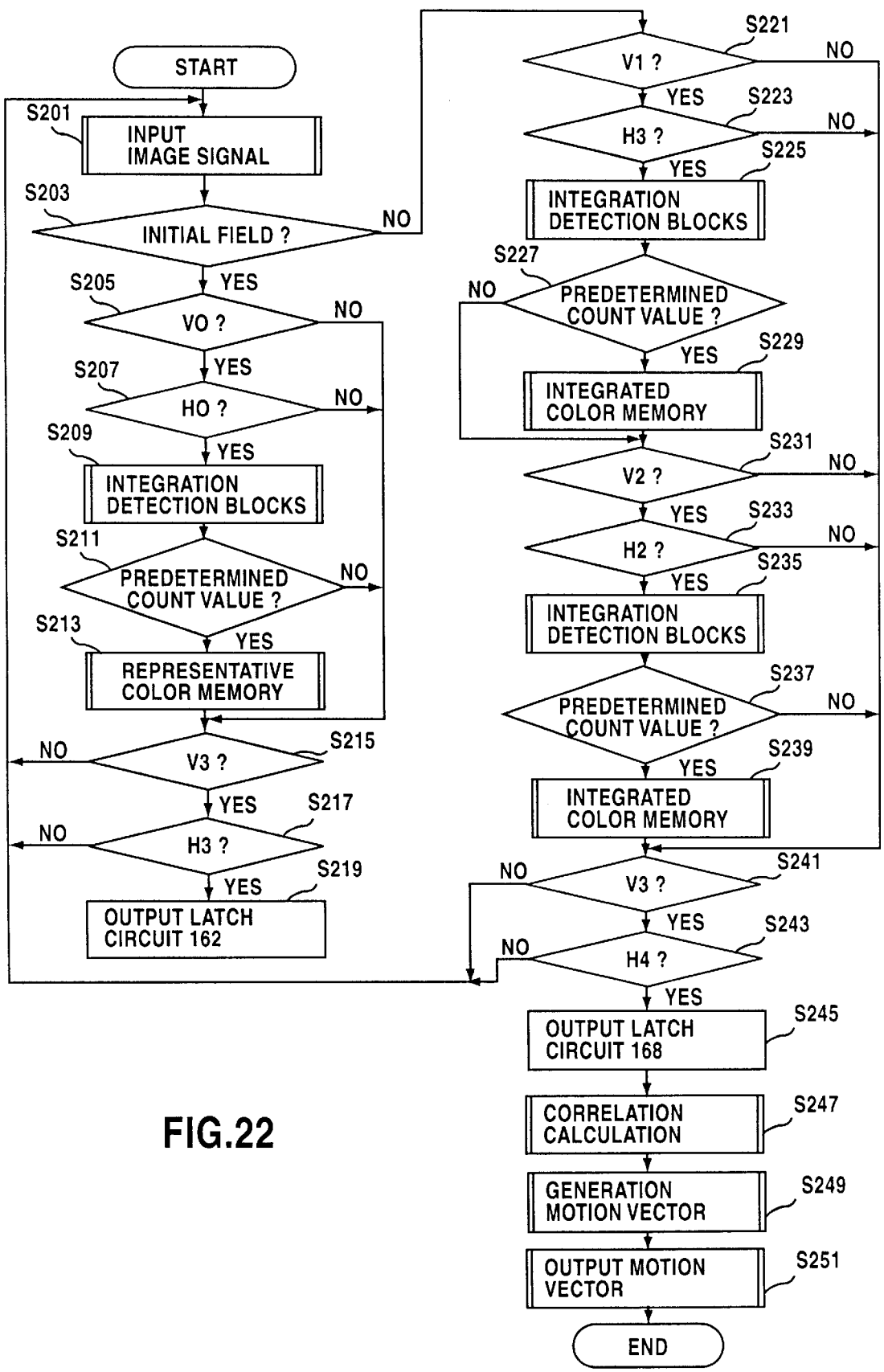
FIG. 22 is a flowchart showing a major operation of FIG. 19 embodiment.

In a stop S201 shown in FIG. 22, the image signal is inputted, and in a step S203, it is determined whether or not a field is the initial field. If "YES" is determined, when the vertical signal V0 is outputted in a step S205 and the horizontal signal H0 is outputted in a step S207, in a step S209, the integrated color data are calculated by the detection block integration circuit 154, and then, in a step S211, it is determined whether or not the counter (not shown) within the detection block integration circuit 154 reaches the predetermined count value, e.g. "64". If "YES" is determined, in a step S213, the integrated color data from the detection block integration circuit 154 is stored in the representative color memory 158, and then, the process proceeds to a step S215. If "NO" is determined in the step S205, S207 or S211, the process also proceeds to the step S215

When the vertical signal V3 is outputted in the step S215 and the horizontal signal H3 is outputted in a step S217, in a step S219, the integrated color data being stored in the representative color memory 158 is outputted to the correlator 166 via the latch circuit 162, and then, the process returns to the step S201. In addition, if "NO" is determined in the step S215 or S217, the process also returns to the step S201.

On the other hand, if "NO" is determined in the step S203, that is, it is determined that the field is after the initial field, the process proceeds to a step S221. When the vertical signal V1 is outputted in the step S221 and the horizontal signal H1 is outputted in a step S223, in a step S225, the integrated color data is calculated for each of the twenty-five (25) detection blocks 134, and then, in a step S227, it is determined whether or not the counter (not shown) within the detection block integration circuit 154 reaches the predetermined count value, e.g. "1600 (=8×8×25)". If "YES" is determined, in a step S229, the integrated color data of the respective detection blocks 134 are stored in the integrated color memory 160, and then, the process proceeds to a step S231. In addition, if "NO" is determined in the step S227, the process also proceeds to the step S231.

When the vertical signal V2 is outputted in the step S231 and the horizontal signal H2 is outputted in a step S233, in a step S235, the integrated color data of sixteen (16) detection blocks 180 are calculated by the detection block integration circuit 184, and then, in a step S237, it is determined whether or not the counter (not shown) within the detection block integration circuit 184 becomes the predetermined count value, e.g. "1024 (=8×8×16)". If "YES", in a step S239, the integrated color data of the respective detection blocks 180 being outputted from the detection block integration circuit 184 are stored in the integrated color memory 160. Then, the process proceeds to a step S241. In addition, if "NO" is determined in the step S221, S223, S231, S233 or S237, the process also proceeds to the step S241.

When the vertical signal V3 is outputted in the step S241 and the horizontal signal H4 is outputted in a step S243, in a step S245, the integrated color data being stored in the integrated color memory 160 are outputted to the correlator 166 via the latch circuit 168. In addition, if "NO" is determined in the step S241 or S243, the process returns to the step S201.

In a step S247, the correlation calculation is performed, but the calculation is similar to that of the above described embodiment, and according to FIG. 16 and FIG. 17. Then, in a step S249, a motion vector is generated by the motion vector generating circuit 172, and in a step S251, the motion vector is outputted.

Thus, by overlaying the detection blocks 180 on the detection blocks 134, the detection accuracy of the moving amount can be increased because intervals between the detection blocks becomes smaller, and accordingly, it is possible to obtain the motion vector with more accurately.

A motion vector detection circuit 214 shown in FIG. 23 can be also utilized in the object tracking camera device 10.

Furthermore, in the above described embodiment, as the color information, three (3) color components of Y, R-Y and B-Y signals are utilized. Such color components are effective for processing a video signal. Otherwise, in a case where a signal from a primary-system CCD is to be processed, three (3) color components of R, G and B signals may be used, and in a case where a signal from a CCD in which a mosaic filter of complementary colors is to be processed, it is preferable that three (3) color components of Y, Cr (=R−2G) and Cb (=B−2G) signals are used.

Furthermore, other three (3) color components of R/Y, G/Y and B/Y signals obtained by dividing the R, G and B signals by the Y signal may be utilized. By normalizing by dividing the color components by the Y signal, an influence of a brightness due to illuminations can be removed, and therefore, if there are two colors having the same hue and the same saturation, the two colors can be regarded as the same color.

In addition, the threshold value may be arbitrarily set in accordance with a degree of the correlation being required and the kind of color components constituting the color information.

Furthermore, in the above described embodiment, a case where the motion vector detection circuit 16 is applied to the object tracking camera device 10; however, it is needless to say that the motion vector detection circuit according to the present invention can be applied to a vide camera having picture stabilization function.

The motion vector detection circuit 214 shown in FIG. 23 includes an A/D converter 216 which converts the image signal being inputted into digital data for each pixel. The digital data is data obtained by converting Y, R-Y and B/Y signals.

The image signal is also applied to an Hsync separation circuit 218 and a horizontal address counter 220. The number of pixels in a horizontal direction is counted in the horizontal address counter 220 according to the image signal, and the horizontal address counter 220 is reset at every one line on the basis of a horizontal synchronization signal from the Hsync separation circuit 218. An output from the horizontal address counter 220 is applied to a horizontal decoder 222 which outputs six (6) kinds of horizontal signals H0 to H3 and H2' and H3'.

The image signal is also applied to a Vsync separation circuit 224 and a vertical address counter 226. In the vertical address counter 226, the number of pixels in a vertical direction is counted in accordance with the image signal, and the vertical address counter 226 is reset at every one field on the basis of a vertical synchronization signal from the Vsync separation circuit 224. An output from the vertical address counter 226 is applied to a vertical decoder 228 which outputs three (3) kinds of vertical signals V0 to V2.

Figure 24A:
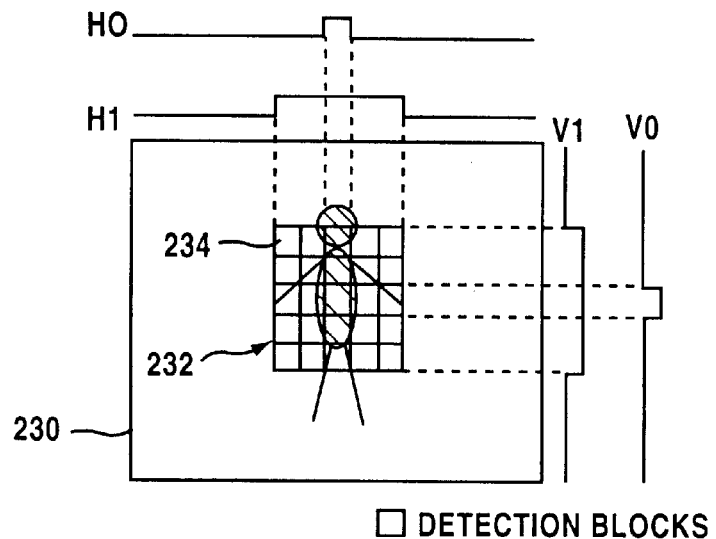
FIG. 24(A) is an illustrative view showing a horizontal signal and a vertical signal for producing an enable signal for a latch circuit 44.
Figure 24B:
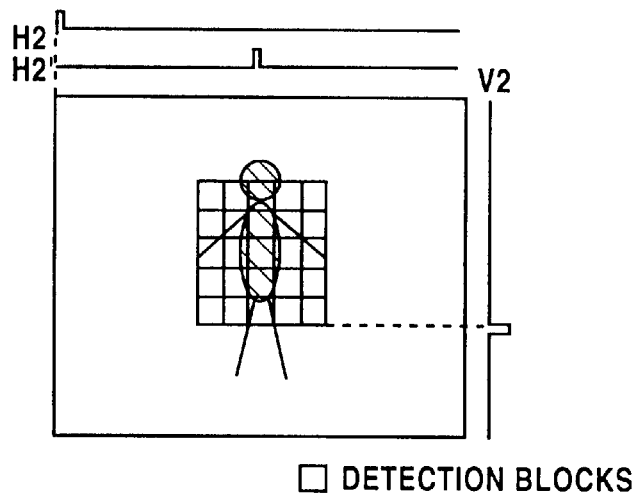
FIG. 24(B) is an illustrative view showing a horizontal signal and a vertical signal for producing an enable signal for a latch circuit 64.
Figure 24C:
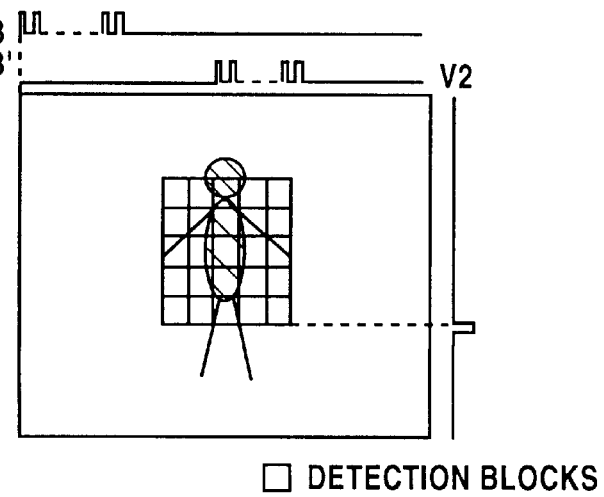
FIG. 24(C) is an illustrative view showing a horizontal signal and a vertical signal for producing an enable signal for a latch circuit 72.

The horizontal signals H0 to H3 and H2' and H3' and the vertical signals V0 to V2 are shown in FIG. 24(A) to FIG. 24(C). In FIG. 24, a motion vector detection area 233 is displayed on a screen 230 of the view finder 12a is divided into a plurality of, twenty-five (25) in this embodiment shown, detection blocks 234.

The motion vector detection circuit 214 includes a CPU 236 to which a tracking mode switch 238 for setting an object tracking mode is connected. When the tracking mode switch 238 is turned-on, an initial field signal a is outputted from the CPU 236 at an initial field,i.e. a filed just after the operation of the object tracking is started.

Furthermore, a ROM 240 and a RAM 242 are connected to the CPU 236. In the ROM 240, a program for controlling an operation of the motion vector detection circuit 214 is stored in advance, and in the RAM 242, a flag indicating whether or not each of correlation values (described later) of the detection blocks 234 is larger than a threshold value, a flag whether a first representative color is used or a second representative color is used for detecting a motion vector, and etc. are stored.

Then, the digital data of the image signal is latched by a latch circuit 244 on the basis of the horizontal signals H0 and H1, the vertical signals V0 and V1, and the initial field signal a.

More specifically, when the tracking niode switch 258 is turned-on, the signal a is outputted from the CPU 236 to an AND gate 246 during a period of the initial field. At the initial field, when the horizontal signal H0 and the vertical signal V0 are outputted, an enable signal is applied to the latch circuit 244 via an OR gate 248. In response to the enable signal, the data of respective pixels of the specific detection block 234a shown in FIG. 25(A) are latched in the latch circuit 244. As the specific detection block 234a, a block existing at a center of the motion vector detection area 232 is used. A reason why the center block is used as the specific detection block 234a is that distances between the specific detection block 234a and edges of the motion vector detection area 232 becomes equal to each other in right and left and upper and lower.

Furthermore, at fields after the initial field, the initial field signal a is not outputted, and therefore, when the horizontal signal H1 and the vertical signal V1 are outputted, an enable signal is applied to the latch circuit 244 via an AND gate 250 and an OR gate 248. In response to the enable signal, the latch circuit 244 latches the data of the respective pixels of all the detection blocks shown in FIG. 25(B).

Then, the data of the specific detection block 234a or the detection blocks 234 being changed by the enable signals and shown by FIG. 25(A) or FIG. 25(B) are applied to a detection block integration circuit 252.

With referring to FIG. 26, an operation of the detection block integration circuit 252 will be described. A detection block 234 shown in FIG. 26 includes pixels of 64 (=8×8), for example. Values of three (3) color components constituting the color information of each pixels are assumed as Yij, (r-y)ij and (b-y)ij as shown in FIG. 26.

On such the assumption, the integrated color data of the color information (the color information data) of the pixels included in the specific detection block 234a, e.g. a first representative color data and a second representative color data can be evaluated by the following equations (7) and (8).

$$Y1 = \sum_{GASO} y_{ij} \tag{7}$$

$$(R-Y)1 = \sum_{GASO} (r-y)_{ij}$$

$$(B-Y)1 = \sum_{GASO} (b-y)_{ij}$$

$$Y2 = \sum_{GASO} y_{ij} \tag{8}$$

$$(R-Y)2 = \sum_{GASO} (r-y)_{ij}$$

$$(B-Y)2 = \sum_{GASO} (b-y)_{ij}$$

In addition, the first representative color data is integrated color data obtained at the initial field during which the initial field signal a is outputted. The second representative color data is integrated color data obtained at fields during which a signal b or c is outputted after the initial field. Then, If the initial field signal a is applied to a selector 254, the first representative color data is stored in a representative color memory 256 via the selector 254. At the fields after the initial field, if the signal b or c is applied to the selector 254, the second representative color data is stored in a representative color memory 258 via the selector 254.

Furthermore, in the field after the initial field, the data of all pixels of all of the twenty-five (25) detection blocks 234 shown in FIG. 25(B) are applied to the detection block integration circuit 252 through the latch circuit 244 in response to the enable signal. In the detection block integration circuit 252, the color information of each pixel is integrated, and therefore, integrated color data is obtainable. The integrated color data for each of the detection blocks 234 can be evaluated by the following equations (9).

$$Y_{xy} = \sum_{GASO} y_{ij} \tag{9}$$

$$(R-Y)_{xy} = \sum_{GASO} (r-y)_{ij}$$

$$(B-Y)_{xy} = \sum_{GASO} (b-y)_{ij}$$

At this time, since the initial field signal a is not applied to the selector 254, the integrated color data which are obtained for each field after the initial field are stored in an integrated color memory 260 at every filed.

In addition, the detection block integration circuit 252 includes counters A and B (not shown) for counting the number of pixels being applied from the latch circuit 244. Then, in this embodiment shown, if the counter A counts 64 (=8×8) at the initial field, the first representative color data is outputted from the detection block integration circuit 252. If the counter B counts 1600 (=8×8×25) at each field after the initial field, twenty-five (25) integrated color data are outputted from the detection block integration circuit 252. The second representative color data is selected from the twenty-five (25) integrated color data.

Then, a selector 262 is controlled by the signal b, and therefore, when the signal b is not outputted, only the first representative color data is selected, and when the signal b is outputted, both of the first and second representative color data are selected.

Then, if the horizontal signals H2 and H2' and the vertical signal V2 shown in FIG. 24(B) are applied to an AND gate 266 which is connected to a latch circuit 264 via an OR gate 268, the representative color data is latched. That is, at a time that the signal b is not outputted, in response to the horizontal signal H2 and the vertical signal V2, the first representative color data is latched. In addition, at a time that the signal b is outputted, in response to the horizontal signal H2 and the vertical signal V2, the first representative color data is latched, and in response to the horizontal signal H2' and the vertical signal V2, the second representative color data is latched. The representative color data being latched is applied to a correlator 270.

When the horizontal signals H3 and H3' and the vertical signal V2 shown in FIG. 24(C) are applied to an AND gate 274 which is connected to a latch circuit 272 via an OR gate 276, the integrated color data within the integrated color memory 260 is latched. In the latch circuit 272, the integrated color data of the integrated color data memory 260 are latched twice at timings that the horizontal signals H3 and H3' are outputted, and applied to the correlator 270. The horizontal signals H3 and H3' are outputted a plurality of times corresponding to the number of detection blocks. Therefore, in the first registration determination mode, the horizontal signals H3 and H3' are outputted twenty-five (25) times.

In the correlator 270, calculations on the basis of the representative color data from the latch circuit 264 and the integrated color data from the latch circuit 272 is performed, thereby to obtain correlation values.

As to the first representative color data and the integrated color data, according to the following equation (10), absolute difference values of the integrated values of respective color components, and a sum Dxy is calculated.

$$Dxy=|Xxy-Y1|+|(R-Y)xy-(R-Y)1|+|(B-Y)xy-(B-Y)1| \tag{10}$$

In a similar manner, as to the second representative color data and the integrated color data, according to the following equation (11), absolute difference values of the integrated values of respective color components, and a sum Dxy is calculated.

$$Dxy=|Xxy-Y2+|(R-Y)xy-(R-Y)2|+|(B-Y)xy-(B-Y)2| \tag{11}$$

That is, if the signal b is not outputted to the correlator 270, first correlation values are evaluated, and the signal b is outputted, both of the first correlation values and second correlation values are evaluated. The correlation values are given to the CPU 236.

Although an operation of the CPU 236 will be described later, in the CPU 236, each of the correlation values obtained for each detection block is compared with a predetermined threshold value.

First, in the fields after the initial field, if a condition that the correlation value is larger that the threshold value is satisfied in each of all the detection blocks 234, it is determined that correlation between images within the motion vector detection area 232 at the initial field and a current field is low. At this time, it is determined that the motion vector can not be evaluated even if the first representative color data is utilized, and then, the signal b is outputted such that the representative color data is changed.

Then, by using the second representative color data instead of the first representative color data, the motion vector is detected.

Then, in the field at which the signal b is outputted, the CPU 236 determines whether or not the second correlation value obtained with utilizing the second representative color data satisfies the condition that the correlation value is larger that the threshold value for each of all the detection blocks 234. If this conditions are satisfied, it is determined that correlation between images within the motion vector detection area 232 at the field wherein the second representative color data is obtained and a current field is low. At this time, it is determined that the motion vector can not be evaluated even if the second representative color data is utilized, and then, the signal c is outputted such that the representative color data is renewed. Then, by using the second representative color data as renewed, the motion vector is detected.

Furthermore, in the field at which the signal b is outputted, the CPU 236 determines whether or not the first correlation value obtained with utilizing the first representative color data, as well as the second correlation values, satisfies the condition that the correlation value is larger that the threshold value for each of all the detection blocks 234. If this conditions become not to be satisfied by the first correlation value, it is determined that correlation between images within the motion vector detection area 232 at the initial field and a current field becomes high. At this time, it is determined that the motion vector can be evaluated if the first representative color data is utilized, and then, the signal b becomes not to be outputted such that the motion vector is evaluated with utilizing the first representative color data.

Thus, according to the determination of the CPU 236, the representative color data is selected for detecting the motion vector.

Figure 27A:
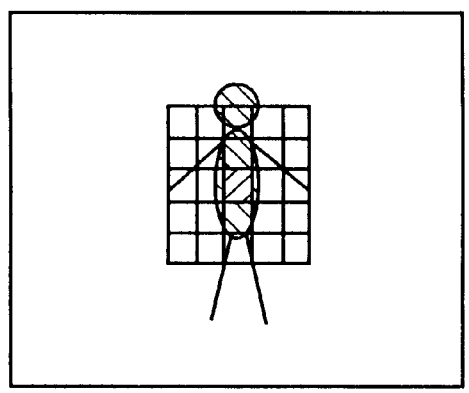
FIG. 27(A) to FIG. 27(C) are illustrative views showing an operation of generation of a motion vector and an operation of object tracking.
Figure 27B:
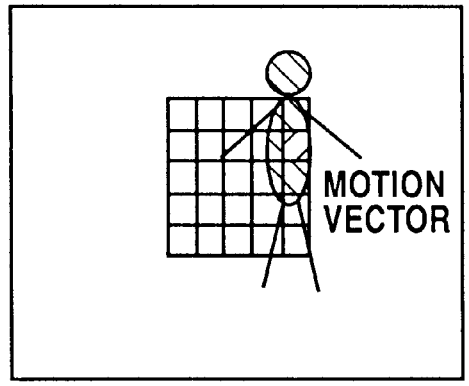
Figure 27C:
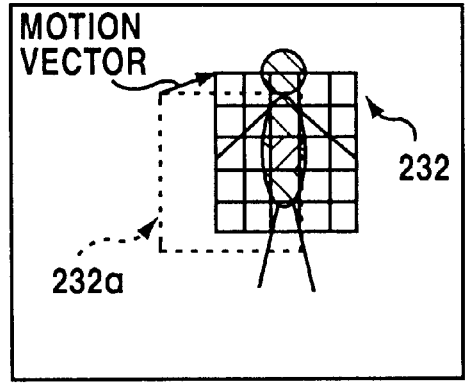

In addition, the first correlation values or the second correlation values are applied to a motion vector generating circuit 278 when the signal b is not outputted or when the signal b is outputted. In the motion vector generating circuit 278, it is determined that a center of the specific detection block 234a is moved to a position where the Dxy becomes a minimum value, whereby a motion vector indicating a moving amount and a moving direction of the object (see FIG. 27(A) and FIG. 27(B)) is obtained. In a next field, as shown in FIG. 27(C), the motion vector detection area 232 is moved by an amount and a direction defined by the motion vector.

Next, with referring to FIG. 28 and FIG. 29, a major operation of the object tracking camera device 10 of this embodiment shown will be described.

Figure 28:
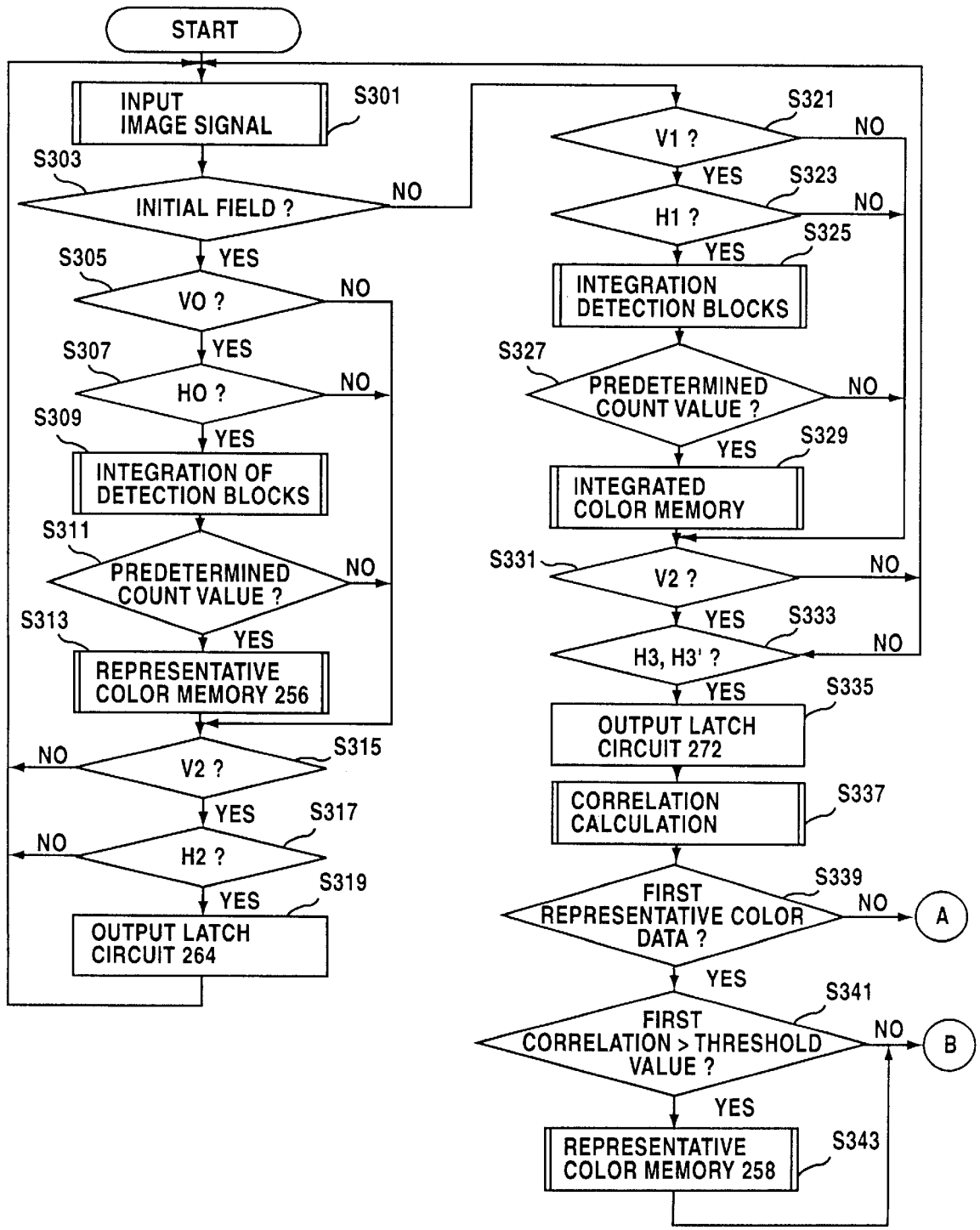
FIG. 28 is a flowchart showing a major operation of the embodiment.

In a step S301 shown in FIG. 28, the image signal is inputted, and in a step S303, it is determined whether or not the a field is the initial field. If the field is a field just after the operation of the object tracking is started in response to the turning-on of the tracking mode switch 238, the field is determined as the initial field, and otherwise, it is determined that a field is not the initial field.

If "YES" is determined in the step S303, when the vertical signal V0 is outputted in a step S305 and the the horizontal signal H0 is outputted in a step S307, the process proceeds to a step S309 wherein the integrated color data of the color information of the specific detection block 234a is calculated by the detection block integration circuit 252. In a step S311, it is determined whether or not the counter A (not shown) of the detection block integration circuit 252 becomes the predetermined count value. In this embodiment shown, it is determined whether or not the count value of the counter A becomes "64". If "YES", the process proceeds to a step S313 in which the integrated color data of the color information is stored in the representative color memory 256 as the first representative color data, and then, the process further proceeds to a step S315. If "NO" in the step S305, S307 or S311, the process also proceeds to the step S315.

If the vertical signal V2 is outputted in the step S315 and the horizontal signal H2 is outputted in a step S317, in a step S319, the first representative color data stored in the representative color memory 256 is applied to the correlator 270 via the selector 262 and the latch circuit 264, and then, the process returns to the step S301. If "NO" is determined in the step S315 or S317, the process also returns to the step S301.

Then, in the step S301, the image signal is inputted, and if "NO" is determined in the step S303, the process proceeds to a step S321.

If the vertical signal VI is outputted in the step S321 and the horizontal signal HI is outputted in a step S323, in a step S325, the integrated color data for each of the twenty-five (25) detection blocks 234 is calculated by the detection block integration circuit 252, and then, in a step S327, it is determined whether or not the counter B (not shown) in the detection block integration circuit 252 reaches a predetermined count value. In this embodiment shown, the predetermined count value is "1600 (=64×25)". If "YES" in a step S327, in a step S329, the integrated color data are stored in the integrated color memory 260, and then, the process proceeds to a step S331. If "NO" in the step 6321, S323 or S327, the process also proceeds to the step S331.

If the vertical signal V2 is outputted in the step S331 and the horizontal signals H3 and H3' are outputted in a step S333, the process proceeds to a step S335. If "NO" in the step S331 or S333, the process returns to the step S301.

In the step S335, the integrated color data being stored in the integrated color memory 260 is applied to the correlator 270 via the latch circuit 272, and then, in a step S337, the correlation calculations are performed, and in this embodiment shown, for all the detection blocks 234, the correlation values are obtained, and the process proceeds to a step S339.

In the step S339, it is determined whether or not the motion vector is detected with utilizing the first representative color, i.e. the first correlation values. If "YES" in the step S339, in a step S341, it is determined whether or not the condition that the first correlation value is larger than the threshold value can be satisfied in each of all the detection blocks 234. If "NO", the motion vector is detected by utilizing the first representative color data.

On the other hand, if "YES" is determined in the step S341, it is determined that the images within the motion vector detection area 232 at the initial field and the current field becomes low. For example, such a case is a case where the designated color disappears from the image signal due to rotation of the object, for example. At this time, the representative color data is changed in a step S343. That is, the signal b is outputted, and therefore, the second representative color data is stored in the representative color memory 258 via the selector 254. Thereafter, the motion vector is detected by utilizing the second representative color data.

Figure 29:
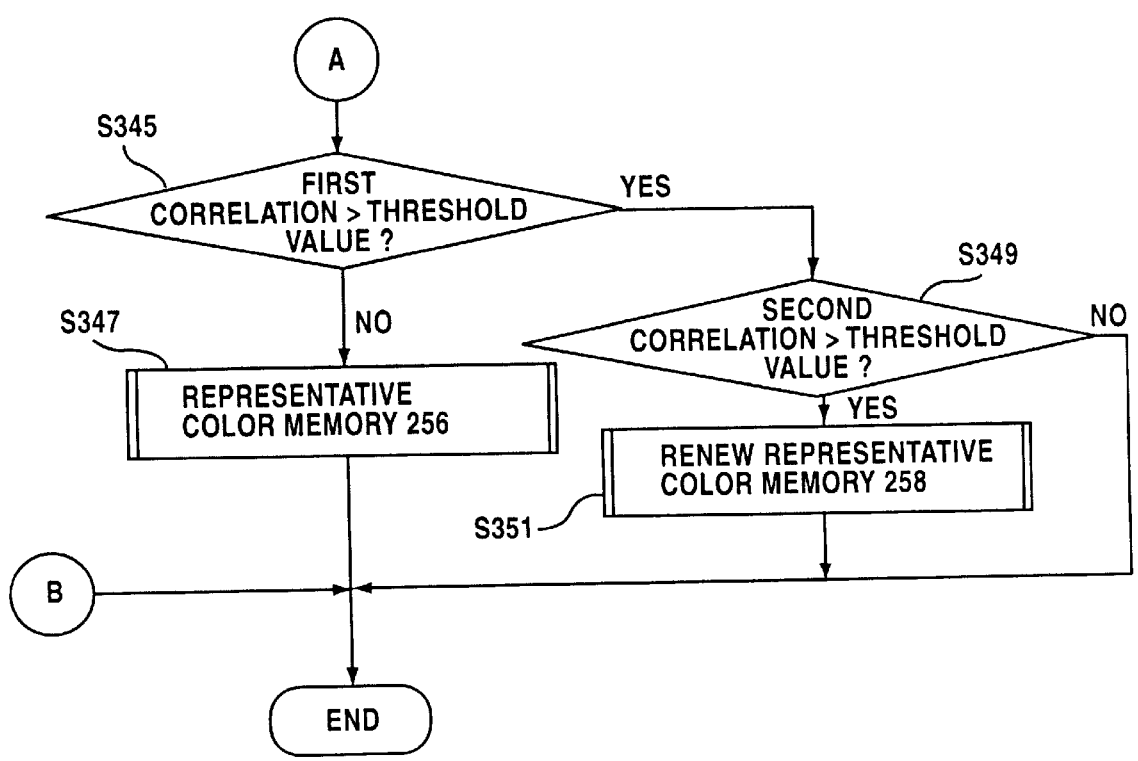
FIG. 29 is a flowchart showing steps succeeding to FIG. 28.

Furthermore, if "NO" is determined in the step S339, in a step S345 shown in FIG. 29. A fact that "NO" is determined in the step S339 means that the motion vector is detected with utilizing the second representative color data, i.e. the second correlation values, and in the correlator 270, not only the first correlation values are evaluated by using the first representative color data but also the second correlation values are evaluated by using the second representative color data.

In a step S345, it is determined whether or not the condition that the first correlation value is larger than the threshold value can be satisfied in each of all the detection blocks 234. If "NO", it is determined that the images within the motion vector detection area 232 at the initial field and the current field becomes high. For example, such a case is a case where the designated color appears again in the image signal due to rotation of the object, for example. At this time, in a step S347, the signal b becomes not to be outputted such that the motion vector is again detected by utilizing the first representative color data being store in the representative color memory 256.

On the other hand, if "YES" in the step S345, in a step S349, it is determined whether or not the condition that the second correlation value is larger than the threshold value can be satisfied in each of all the detection blocks 234. If "YES", it is determined that the images within the motion vector detection area 232 at the field in which the second representative color is obtained and the current field is low, and then, the second representative color data is renewed in a step S351. That is, the signal c is outputted, and therefore, the second representative color data at the current field is written in the representative color memory 258 via the selector 254. Accordingly, the motion vector becomes to be detected with utilizing the renewed second representative color data. In addition, if "NO" i the step S349, the second representative color data is not renewed, and therefore, the motion vector is detected on the basis of the second representative color data being not renewed.

Thus, in accordance with the embodiment, even if the designated color disappears from the motion vector detection area, by changing the representative color, it is possible to continue to track the object. In addition, if the designated color is detected again, the motion vector can be detected by the designated color. Therefore, it is possible to track the object effectively.

Furthermore, in the above described embodiment, as the color information, three (3) color components of Y, R-Y and B-Y signals are utilized. Such color components are effective for processing a video signal. Otherwise, in a case where a signal from a primary-system CCD is to be processed, three (3) color components of R, G and B signals may be used, and in a case where a signal from a CCD in which a mosaic filter of complementary colors is to be processed, it is preferable that three (3) color components of Y, Cr (=R−2G) and Cb (=B−2G) signals are used.

Furthermore, other three (3) color components of R/Y, G/Y and B/Y signals obtained by dividing the R, G and B signals by the Y signal may be utilized. By normalizing by dividing the color components by the Y signal, an influence of a brightness due to illuminations can be removed, and therefore, if there are two colors having the same hue and the same saturation, the two colors can be regarded as the same color.

In addition, the threshold value may be arbitrarily set in accordance with a degree of the correlation being required and the kind of color components constituting the color information.

Furthermore, in the above described embodiment, a case where the motion vector detection circuit 16 is applied to the object tracking camera device 10; however, it is needless to say that the motion vector detection circuit according to the present invention can be applied to a vide camera having picture stabilization function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion vector detection circuit which detects a motion vector of an object utilizing color information of a plurality of detection blocks defined within a motion vector detection area, comprising:

a first calculation means for obtaining first color information data on the basis of the color information of a specific detection block, said first color information data including at least a first data subset containing information of a first color and a second data subset containing information of a second color, different from said first color;

a second calculation means for obtaining second color information data for each of desired detection blocks on the basis of the color information of each of the desired detection blocks, said second color information data including at least a first data subset containing information of said first color and a second data subset containing information of said second color; and a detection means for detecting the motion vector of said object on the basis of said first color information data and said second color information data, said detection means including a registration determining means for determining on the basis of said first and second data subsets of said first color information data and said first and second data subsets of said second color information data whether or not said first color information data is to be registered for detection of the motion vector, and a motion vector detection means for detecting the motion vector of said object in accordance with a determination result by the registration determining means.

2. A circuit according to claim 1, wherein said registration determining means includes a correlation means for detecting a correlation value of said first color information data and said second color information data, a comparison means for comparing said correlation value with a threshold value, and a determination means for determining on the basis of a comparison result by the comparison means whether or not said first color information data is to be registered.

3. A circuit according to claim 1, wherein said second color information data includes second color information data for all the detection blocks within the motion vector detection area.

4. A circuit according to claim 1, wherein said second color information data includes second color information data of detection blocks the number of which is smaller than the number of all the detection blocks within the motion vector detection area and which are arranged around said specific detection block.

5. A circuit according to claim 4, wherein said detection blocks includes detection blocks at left upper, right upper, left lower and right lower with respect to said specific detection block.

6. A circuit according to claim 1, wherein said registration determining means includes a first registration determination means for determining on the basis of said first color information data and said second color information data of all the detection blocks within the motion vector detection area whether or not said first color information data is to be registered, and a second registration determination means for determining on the basis of said first color information data and said second color information data of the detection blocks the number of which is smaller than the number of all the detection blocks within the motion vector detection area and which are arranged around said specific detection block whether or not said first color information data is to be registered, and said circuit further comprising a selection means for selecting one of the first registration determination means and the second registration determination means.

7. A circuit according to claim 1, wherein said detection means includes a same color block detection means for detecting a same color detection block which is regarded as a detection block having the same color as that of said specific detection block on the basis of said first color information data and said second color information data, a large block detection means for detecting a large block constituted by the same color detection block, a gravity detection means for detecting a gravity of the large block, and a motion vector detection means for detecting the motion vector of said object on the basis of said gravity.

8. A circuit according to claim 7, wherein said plurality of detection blocks are arranged in a superposed manner within the motion vector detection area.

9. A circuit according to claim 1, wherein said color information includes three kinds of color components different from each other.

10. A circuit according to claim 9, wherein said three kinds of color components include Y, R-Y and B-Y signals.

11. A circuit according to claim 9, wherein three kinds of color components include Y, Cr and Cb signals.

12. An object tracking camera device utilizing a motion vector detection circuit which detects a motion vector of an object utilizing color information of a plurality of detection blocks defined within a motion vector detection area, comprising:

a first calculation means for obtaining first color information data on the basis of the color information of a specific detection block, said first color information data including at least a first data subset containing information of a first color and a second data subset containing information of a second color, different from said first color;

a second calculation means for obtaining second color information data for each of desired detection blocks on the basis of the color information of each of the desired detection blocks, said second color information data including at least a first data subset containing information of said first color and a second data subset containing information of said second color;

a third calculation means for obtaining third color information data for each of said detection blocks on the basis of the color information of each of said detection blocks, said third color information data including at least a first data subset containing information of said first color and a second data subset containing information of said second color;

a correlation means for evaluating a correlation value on the basis of said first and second data subsets of said first color information data and said first and second data subsets of one of said second color information data and said third color information data;

a comparing means for comparing said correlation value with a predetermined threshold value; and a detection determination means for determining on the basis of a comparison result of said comparison means whether or not the motion vector can be detected;

a detection means for detecting the motion vector of said object on the basis of said first and second data subsets of said first color information data and said first and second data subsets of said second color information; and a control means for controlling a camera according to the motion vector detected by the detection means.

13. A motion vector detection circuit which detects a motion vector of an object utilizing a plurality of detection blocks set within a motion vector detection area, comprising:

a first calculation means for obtaining first color information data on the basis of color information of a specific detection block at a field just after an operation for object tracking is started, said first color information data including at least a first data subset containing information of a first color and a second data subset containing information of a second color, different from said first color;

a second calculation means for obtaining second color information data on the basis of the color information of said specific detection block at another field, said second color information data including at least a first data subset containing information of said first color and a second data subset containing information of said second color;

a third calculation means for obtaining third color information data for each of said detection blocks on the basis of the color information of each of said detection blocks, said third color information data including at least a first data subset containing information of said first color and a second data subset containing information of said second color;

a judge means for judging which one of said first color information data and said second color information data is to be utilized for detecting the motion vector, said judge means including a correlation means for evaluating a correlation value on the basis of said first and second data subsets of said first color information data and said first and second data subsets of one of said second color information data and said third color information data, a comparing means for comparing said correlation value with a predetermined threshold value, and a detection determination means for determining on the basis of a comparison result of said comparison means whether or not the motion vector can be detected; and a detection means for detecting the motion vector on the basis of said first and second data subsets of one of said first color information data and said second color information data.

14. A circuit according to claim 13, wherein said judge means judges that said second color information data is to be utilized when it is impossible to detect the motion vector with utilizing said first color information data.

15. A circuit according to claim 13, wherein said judge means includes a renewing means for renewing said second color information data at a time that the motion vector can not be detected with utilizing the second color information data.

16. A circuit according to claim 13, wherein said judge means judges that said first color information data is to be utilized instead of said second color information data if it becomes possible to detect the motion vector with utilizing said first color information data when the motion vector is detected with utilizing said second color information data.

17. A circuit according to claim 13, wherein said judge means judges that it is impossible to detect the motion vector at a time that said correlation value is larger than said threshold value in each of all the detection blocks.

18. A circuit according to claim 13, wherein said color information includes three kinds of color components different from each other.

19. A circuit according to claim 18, wherein said three kinds of color components include Y, R-Y and B-Y signals.

20. A circuit according to claim 18, wherein three kinds of color components include Y, Cr and Cb signals.

21. An object tracking camera device utilizing a motion vector detection circuit which detects a motion vector of an object with utilizing a plurality of detection blocks set within a motion vector detection area, comprising:

a first calculation means for obtaining first color information data on the basis of color information of a specific detection block at a field just after an operation for object tracking is started, said first color information data including at least a first data subset containing information of a first color and a second data subset containing information of a second color, different from said first color;

a second calculation means for obtaining second color information data on the basis of the color information of said specific detection block at another field, said second color information data including at least a first data subset containing information of said first color and a second data subset containing information of said second color;

a judge means for judging which one of said first color information data and said second color information data is to be utilized for detecting a motion vector, said judge means including a registration determining means for determining on the basis of said first and second data subsets of said first color information data and said first and second data subsets of said second color information data whether or not said first color information data is to be registered for detection of the motion vector, and a motion vector detection means for detecting the motion vector of said object in accordance with a determination result by the registration determining means;

a detection means for detecting the motion vector on the basis of said first and second data subsets of one of said first color information data and said second color information data; and a control means for controlling a camera according to the motion vector detected by the detection means.

22. A circuit according to claim 7, wherein said gravity detection means includes a selecting means for selecting a large block having a largest area when a plurality of large blocks exists within the motion vector detection area, and a means for detecting a gravity of the large block having the largest area.

* * * * *